US008848763B2

(12) United States Patent
Han et al.

(10) Patent No.: US 8,848,763 B2
(45) Date of Patent: Sep. 30, 2014

(54) METHOD AND DEVICE FOR TRANSMITTING UPLINK CONTROL INFORMATION IN WIRELESS COMMUNICATION SYSTEM

(75) Inventors: Seung Hee Han, Anyang-si (KR); Ji Woong Jang, Anyang-si (KR); Jae Hoon Chung, Anyang-si (KR); Han Gyu Cho, Anyang-si (KR); Yeong Hyeon Kwon, Anyang-si (KR); Seung Hyun Kang, Anyang-si (KR)

(73) Assignee: LG Electronics Inc., Seoul (KR)

( * ) Notice: Subject to any disclaimer, the term of this patent is extended or adjusted under 35 U.S.C. 154(b) by 204 days.

(21) Appl. No.: 13/582,031

(22) PCT Filed: Feb. 24, 2011

(86) PCT No.: PCT/KR2011/001281
§ 371 (c)(1),
(2), (4) Date: Aug. 30, 2012

(87) PCT Pub. No.: WO2011/108822
PCT Pub. Date: Sep. 9, 2011

(65) Prior Publication Data
US 2012/0320951 A1    Dec. 20, 2012

Related U.S. Application Data

(60) Provisional application No. 61/309,867, filed on Mar. 3, 2010, provisional application No. 61/310,278, filed on Mar. 4, 2010, provisional application No. 61/316,818, filed on Mar. 23, 2010, provisional application No. 61/317,284, filed on Mar. 25, 2010, provisional application No. 61/318,365, filed on Mar. 28, 2010.

(30) Foreign Application Priority Data

Feb. 22, 2011 (KR) .................. 10-2011-0015653

(51) Int. Cl.
H04B 1/00 (2006.01)
H04L 27/18 (2006.01)
H04L 27/26 (2006.01)
H04B 7/26 (2006.01)

(52) U.S. Cl.
CPC ....... *H04B 7/26* (2013.01); *H04L 27/18* (2013.01); *H04L 27/2636* (2013.01); *H04L 27/26* (2013.01)
USPC .......................................... 375/141

(58) Field of Classification Search
USPC .................................. 375/141, 324
See application file for complete search history.

(56) References Cited

U.S. PATENT DOCUMENTS 7,336,599 B2 *   2/2008  Hwang et al. ............. 370/208
2008/0212464 A1   9/2008  Kim et al.

FOREIGN PATENT DOCUMENTS

| JP | 2006-166438 | 6/2006 |
| JP | 2008-166880 | 7/2008 |
| KR | 10-2006-0087244 | 8/2006 |

*Primary Examiner* — Jaison Joseph
(74) *Attorney, Agent, or Firm* — Lee, Hong, Degerman, Kang & Waimey

(57) ABSTRACT

Disclosed are a method and a device for transmitting uplink control information (UCI) by a terminal in a wireless communication system. The UCI transmission method comprises the steps of: generating an encoding information bit stream by performing channel coding for a UCI bit stream; generating complex modulation symbols by performing modulation for the generated encoding information bit stream; spreading the complex modulation symbols in block-wise on the basis of an orthogonal sequence; and transmitting the spread complex modulation symbols to a base station. The encoding information bit stream is generated by a channel coding for circularly repeating the UCI bit stream.

14 Claims, 33 Drawing Sheets

Normal CP case
(a)

Extended CP case
(b)

(a)

(b)

METHOD AND DEVICE FOR TRANSMITTING UPLINK CONTROL INFORMATION IN WIRELESS COMMUNICATION SYSTEM

CROSS-REFERENCE TO RELATED APPLICATIONS

This application is the National Stage filing under 35 U.S.C. 371 of International Application No. PCDKR2011/001281, filed on Feb. 24, 2011, which claims the benefit of earlier filing date and right of priority to Korean Patent Application No. 10-2011-0015653, filed on Feb. 22, 2011, and also claims the benefit of U.S. Provisional Application Ser. No. 61/309,867, filed on Mar. 3, 2010, U.S. Provisional Application Ser. No. 61/310,278, filed on Mar. 4, 2010, U.S. Provisional Application Ser. No. 61/316,818, filed on Mar. 23, 2010, U.S. Provisional Application Ser. No. 61/317,284, filed on Mar. 25, 2010, and U.S. Provisional Application Ser. No. 61/318,365, filed on Mar. 28, 2010, the contents of which are all hereby incorporated by reference herein in their entirety.

BACKGROUND OF THE INVENTION

1. Field of the Invention

The present invention relates to wireless communication and, more specifically, to a method and apparatus for transmitting uplink control information in a wireless communication system.

2. Related Art

Effective transmission/reception methods and utilizations have been proposed for a broadband wireless communication system to maximize efficiency of radio resources. An orthogonal frequency division multiplexing (OFDM) system capable of reducing inter-symbol interference (ISI) with a low complexity is taken into consideration as one of next generation wireless communication systems. In the OFDM, a serially input data symbol is converted into N parallel data symbols, and is then transmitted by being carried on each of separated N subcarriers. The subcarriers maintain orthogonality in a frequency dimension. Each orthogonal channel experiences mutually independent frequency selective fading, and an interval of a transmitted symbol is increased, thereby minimizing inter-symbol interference.

When a system uses the OFDM as a modulation scheme, orthogonal frequency division multiple access (OFDMA) is a multiple access scheme in which multiple access is achieved by independently providing some of available subcarriers to a plurality of users. In the OFDMA, frequency resources (i.e., subcarriers) are provided to the respective users, and the respective frequency resources do not overlap with one another in general since they are independently provided to the plurality of users. Consequently, the frequency resources are allocated to the respective users in a mutually exclusive manner. In an OFDMA system, frequency diversity for multiple users can be obtained by using frequency selective scheduling, and subcarriers can be allocated variously according to a permutation rule for the subcarriers. In addition, a spatial multiplexing scheme using multiple antennas can be used to increase efficiency of a spatial domain.

Uplink control information (UCI) can be transmitted through a physical uplink control channel (PUCCH). The UCI can include various types of information such as a scheduling request (SR), an acknowledgement/non-acknowledgement (ACK/NACK) signal for hybrid automatic repeat request (HARQ), a channel quality indicator (CQI), a precoding matrix indicator (PMI), a rank indicator (RI), etc. The PUCCH carries various types of control information according to a format.

Uplink control information may be subject to channel coding and transmitted. Any one of various types of coding methods, such as simple repetition, simplex coding, RM coding, punctured RM coding, tail-biting convolution coding (TBCC), low density parity check (LDPC) coding, and turbo coding, may be used as the channel coding method. Each of the channel coding methods have advantages and disadvantages depending on channel environments or systems, and some of the channel coding methods may have different channel coding performance depending on the length of information. Furthermore, in some of the channel coding methods, channel coding may not be performed on information having a length of a constraint length or less.

Accordingly, there is a need for a method of efficiently performing channel coding on information having a length of a constraint length or less.

SUMMARY OF THE INVENTION

The present invention provides a method and apparatus for transmitting uplink control information in a wireless communication system.

In an aspect, a method of transmitting, by a user equipment (UE), uplink control information (UCI) in a wireless communication system is provided. The method includes generating an encoding information bit stream by performing channel coding on an UCI bit stream, generating complex modulation symbols by performing modulation on the generated encoding information bit stream, block-wise spreading the complex modulation symbols based on an orthogonal sequence, and transmitting the spread complex modulation symbols to a base station, wherein the encoding information bit stream is generated by channel coding for circulating and repeating the UCI bit stream.

A length of the UCI bit stream may be smaller than a reference value M determined from a constraint length K.

M may be M=K−1.

The encoding information bit stream may be subject to rate matching.

The rate matching may be performed by puncturing specific bits.

The rate matching may be performed using a circular buffer.

The rate matching may be performed by sequentially reading the UCI bit stream.

Cell-specific scrambling or UE-specific scrambling may be applied to the encoding information bit stream.

The complex modulation symbols may be quadrature phase shift keying (QPSK) symbols generated by QPSK modulation.

The complex modulation symbols may be block-wise spread into a plurality of single carrier-frequency division multiple access (SC-FDMA) symbols.

The orthogonal sequence may be a Walsh code.

The orthogonal sequence may be hopped in a slot level.

In another aspect, a user equipment in a wireless communication system is provided.

The user equipment includes a radio frequency (RF) unit configured to transmit or receive radio signals, and a processor connected to the RF unit, and configured for generating an encoding information bit stream by performing channel coding on an UCI bit stream, generating complex modulation symbols by performing modulation on the generated encoding information bit stream, block-wise spreading the complex modulation symbols based on an orthogonal sequence, and transmitting the spread complex modulation symbols to a base station, wherein the encoding information bit stream is generated by channel coding for circulating and repeating the UCI bit stream.

There is proposed an efficient channel coding method when the length of uplink control information is a constraint length or less.

DESCRIPTION OF EXEMPLARY EMBODIMENTS

The following technique may be used for various wireless communication systems such as code division multiple access (CDMA), a frequency division multiple access (FDMA), time division multiple access (TDMA), orthogonal frequency division multiple access (OFDMA), single carrier-frequency division multiple access (SC-FDMA), and the like. The CDMA may be implemented as a radio technology such as universal terrestrial radio access (UTRA) or CDMA2000. The TDMA may be implemented as a radio technology such as a global system for mobile communications (GSM)/general packet radio service (GPRS)/enhanced data rates for GSM evolution (EDGE). The OFDMA may be implemented by a radio technology such as institute of electrical and electronics engineers (IEEE) 802.11 (Wi-Fi), IEEE 802.16 (WiMAX), IEEE 802.20, E-UTRA (evolved UTRA), and the like. IEEE 802.16m, an evolution of IEEE 802.16e, provides backward compatibility with a system based on IEEE 802.16e. The UTRA is part of a universal mobile telecommunications system (UMTS). 3GPP (3rd generation partnership project) LTE (long term evolution) is part of an evolved UMTS (E-UMTS) using the E-UTRA, which employs the OFDMA in downlink and the SC-FDMA in uplink. LTE-A (advanced) is an evolution of 3GPP LTE.

Hereinafter, for clarification, LTE-A will be largely described, but the technical concept of the present invention is not meant to be limited thereto.

Figure 1:
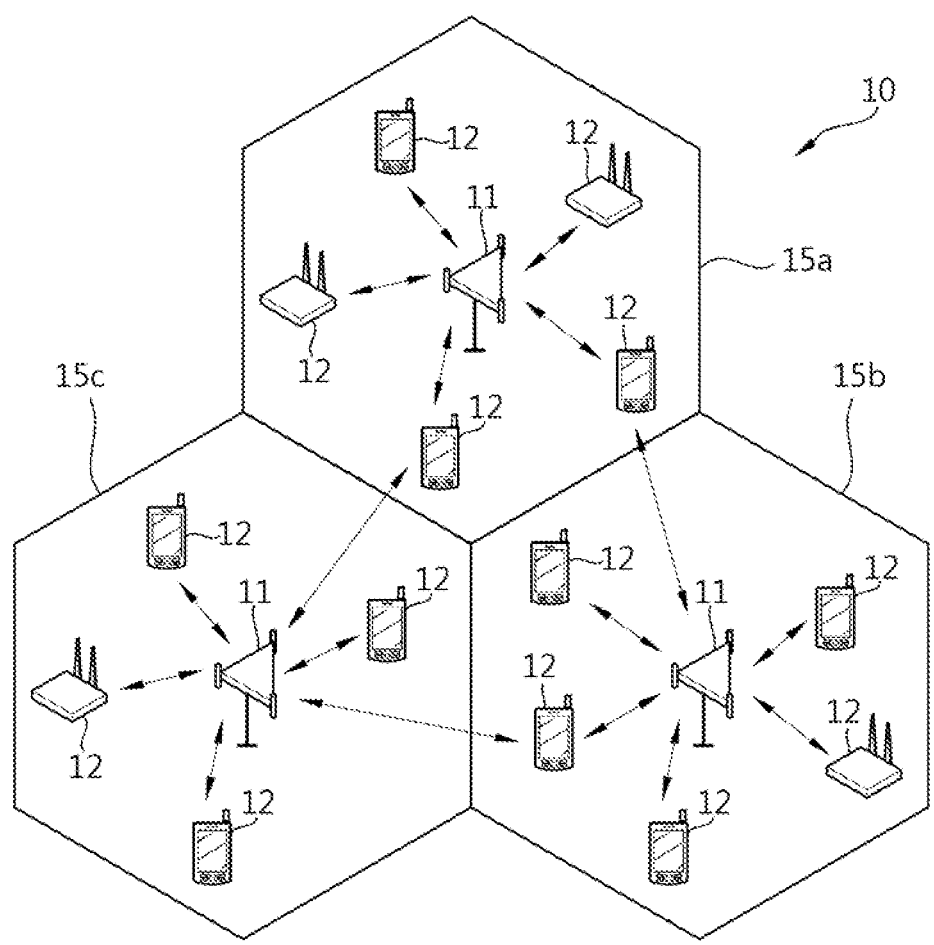
FIG. 1 shows a wireless communication system.

FIG. 1 shows a wireless communication system.

The wireless communication system 10 includes at least one base station (BS) 11. Respective BSs 11 provide a communication service to particular geographical areas 15a, 15b, and 15c (which are generally called cells). Each cell may be divided into a plurality of areas (which are called sectors). A user equipment (UE) 12 may be fixed or mobile and may be referred to by other names such as MS (mobile station), MT (mobile terminal), UT (user terminal), SS (subscriber station), wireless device, PDA (personal digital assistant), wireless modem, handheld device. The BS 11 generally refers to a fixed station that communicates with the UE 12 and may be called by other names such as eNB (evolved-NodeB), BTS (base transceiver system), access point (AP), etc.

In general, a UE belongs to one cell, and the cell to which a UE belongs is called a serving cell. A BS providing a communication service to the serving cell is called a serving BS. The wireless communication system is a cellular system, so a different cell adjacent to the serving cell exists. The different cell adjacent to the serving cell is called a neighbor cell. A BS providing a communication service to the neighbor cell is called a neighbor BS. The serving cell and the neighbor cell are relatively determined based on a UE.

This technique can be used for downlink or uplink. In general, downlink refers to communication from the BS 11 to the UE 12, and uplink refers to communication from the UE 12 to the BS 11. In downlink, a transmitter may be part of the BS 11 and a receiver may be part of the UE 12. In uplink, a transmitter may be part of the UE 12 and a receiver may be part of the BS 11.

The wireless communication system may be any one of a multiple-input multiple-output (MIMO) system, a multiple-input single-output (MISO) system, a single-input single-output (SISO) system, and a single-input multiple-output (SIMO) system. The MIMO system uses a plurality of transmission antennas and a plurality of reception antennas. The MISO system uses a plurality of transmission antennas and a single reception antenna. The SISO system uses a single transmission antenna and a single reception antenna. The SIMO system uses a single transmission antenna and a plurality of reception antennas. Hereinafter, a transmission antenna refers to a physical or logical antenna used for transmitting a signal or a stream, and a reception antenna refers to a physical or logical antenna used for receiving a signal or a stream.

Figure 2:
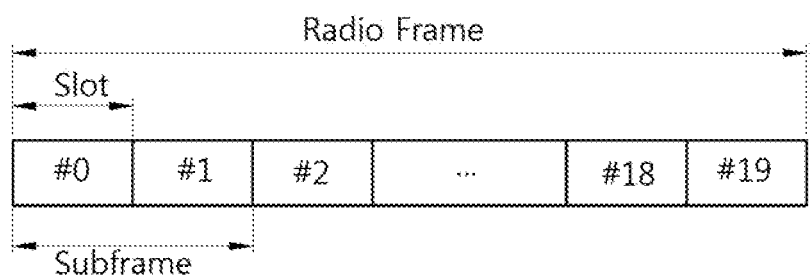
FIG. 2 shows the structure of a radio frame in 3GPP LTE.

FIG. 2 shows the structure of a radio frame in 3GPP LTE.

It may be referred to Paragraph 5 of "Technical Specification Group Radio Access Network; Evolved Universal Terrestrial Radio Access (E-UTRA); Physical channels and modulation (Release 8)" to 3GPP (3rd generation partnership project) TS 36.211 V8.2.0 (2008-03). Referring to FIG. 2, the radio frame includes 10 subframes, and one subframe includes two slots. The slots in the radio frame are numbered by #0 to #19. A time taken for transmitting one subframe is called a transmission time interval (TTI). The TTI may be a scheduling unit for a data transmission. For example, a radio frame may have a length of 10 ms, a subframe may have a length of 1 ms, and a slot may have a length of 0.5 ms.

One slot includes a plurality of orthogonal frequency division multiplexing (OFDM) symbols in a time domain and a plurality of subcarriers in a frequency domain. Since 3GPP LTE uses OFDMA in downlink, the OFDM symbols are used to express a symbol period. The OFDM symbols may be called by other names depending on a multiple-access scheme. For example, when a single carrier frequency division multiple access (SC-FDMA) is in use as an uplink multi-access scheme, the OFDM symbols may be called SC-FDMA symbols. A resource block (RB), a resource allocation unit, includes a plurality of continuous subcarriers in a slot. The structure of the radio frame is merely an example. Namely, the number of subframes included in a radio frame, the number of slots included in a subframe, or the number of OFDM symbols included in a slot may vary.

3GPP LTE defines that one slot includes seven OFDM symbols in a normal cyclic prefix (CP) and one slot includes six OFDM symbols in an extended CP.

The wireless communication system may be divided into a frequency division duplex (FDD) scheme and a time division duplex (TDD) scheme. According to the FDD scheme, an uplink transmission and a downlink transmission are made at different frequency bands. According to the TDD scheme, an uplink transmission and a downlink transmission are made during different periods of time at the same frequency band. A channel response of the TDD scheme is substantially reciprocal. This means that a downlink channel response and an uplink channel response are almost the same in a given frequency band. Thus, the TDD-based wireless communication system is advantageous in that the downlink channel response can be obtained from the uplink channel response. In the TDD scheme, the entire frequency band is time-divided for uplink and downlink transmissions, so a downlink transmission by the BS and an uplink transmission by the UE can be simultaneously performed. In a TDD system in which an uplink transmission and a downlink transmission are discriminated in units of subframes, the uplink transmission and the downlink transmission are performed in different subframes.

Figure 3:
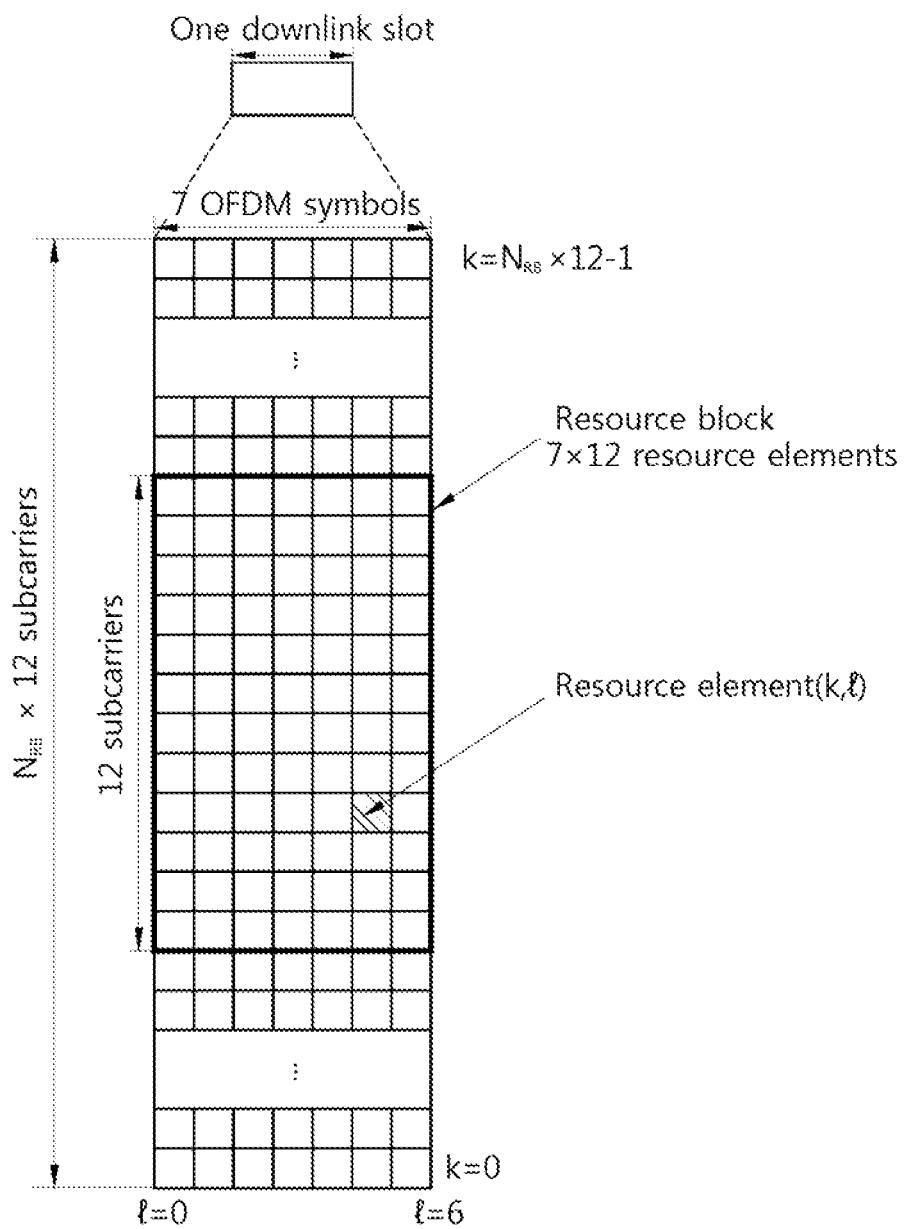
FIG. 3 shows an example of a resource grid of a single downlink slot.

FIG. 3 shows an example of a resource grid of a single downlink slot.

A downlink slot includes a plurality of OFDM symbols in the time domain and $N_{RB}$ number of resource blocks (RBs) in the frequency domain. The $N_{RB}$ number of resource blocks included in the downlink slot is dependent upon a downlink transmission bandwidth set in a cell. For example, in an LTE system, $N_{RB}$ may be any one of 60 to 110. One resource block includes a plurality of subcarriers in the frequency domain. An uplink slot may have the same structure as that of the downlink slot.

Each element on the resource grid is called a resource element. The resource elements on the resource grid can be discriminated by a pair of indexes (k,l) in the slot. Here, k (k=0, ..., $N_{RB}$×12−1) is a subcarrier index in the frequency domain, and l is an OFDM symbol index in the time domain.

Here, it is illustrated that one resource block includes 7×12 resource elements made up of seven OFDM symbols in the time domain and twelve subcarriers in the frequency domain, but the number of OFDM symbols and the number of subcarriers in the resource block are not limited thereto. The number of OFDM symbols and the number of subcarriers may vary depending on the length of a cyclic prefix (CP), frequency spacing, and the like. For example, in case of a normal CP, the number of OFDM symbols is 7, and in case of an extended CP, the number of OFDM symbols is 6. One of 128, 256, 512, 1024, 1536, and 2048 may be selectively used as the number of subcarriers in one OFDM symbol.

Figure 4:
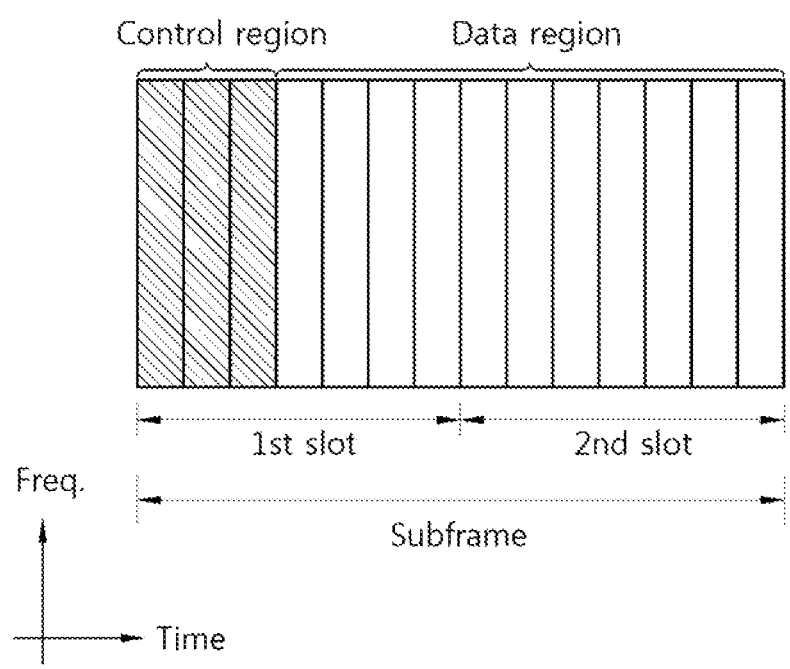
FIG. 4 shows the structure of a downlink subframe.

FIG. 4 shows the structure of a downlink subframe.

A downlink subframe includes two slots in the time domain, and each of the slots includes seven OFDM symbols in the normal CP. First three OFDM symbols (maximum four OFDM symbols with respect to a 1.4 MHz bandwidth) of a first slot in the subframe corresponds to a control region to which control channels are allocated, and the other remaining OFDM symbols correspond to a data region to which a physical downlink shared channel (PDSCH) is allocated.

The PDCCH may carry a transmission format and a resource allocation of a downlink shared channel (DL-SCH), resource allocation information of an uplink shared channel (UL-SCH), paging information on a PCH, system information on a DL-SCH, a resource allocation of an higher layer control message such as a random access response transmitted via a PDSCH, a set of transmission power control commands with respect to individual UEs in a certain UE group, an activation of a voice over internet protocol (VoIP), and the like. A plurality of PDCCHs may be transmitted in the control region, and a UE can monitor a plurality of PDCCHs. The PDCCHs are transmitted on one or an aggregation of a plurality of consecutive control channel elements (CCE). The CCE is a logical allocation unit used to provide a coding rate according to the state of a wireless channel. The CCE corresponds to a plurality of resource element groups. The format of the PDCCH and an available number of bits of the PDCCH are determined according to an associative relation between the number of the CCEs and a coding rate provided by the CCEs.

The BS determines a PDCCH format according to a DCI to be transmitted to the UE, and attaches a cyclic redundancy check (CRC) to the DCI. A unique radio network temporary identifier (RNTI) is masked on the CRC according to the owner or the purpose of the PDCCH. In case of a PDCCH for a particular UE, a unique identifier, e.g., a cell-RNTI (C-RNTI), of the UE, may be masked on the CRC. Or, in case of a PDCCH for a paging message, a paging indication identifier, e.g., a paging-RNTI (P-RNTI), may be masked on the CRC. In case of a PDCCH for a system information block (SIB), a system information identifier, e.g., a system information-RNTI (SI-RNTI), may be masked on the CRC. In order to indicate a random access response, i.e., a response to a transmission of a random access preamble of the UE, a random access-RNTI (RA-RNTI) may be masked on the CRC.

Figure 5:
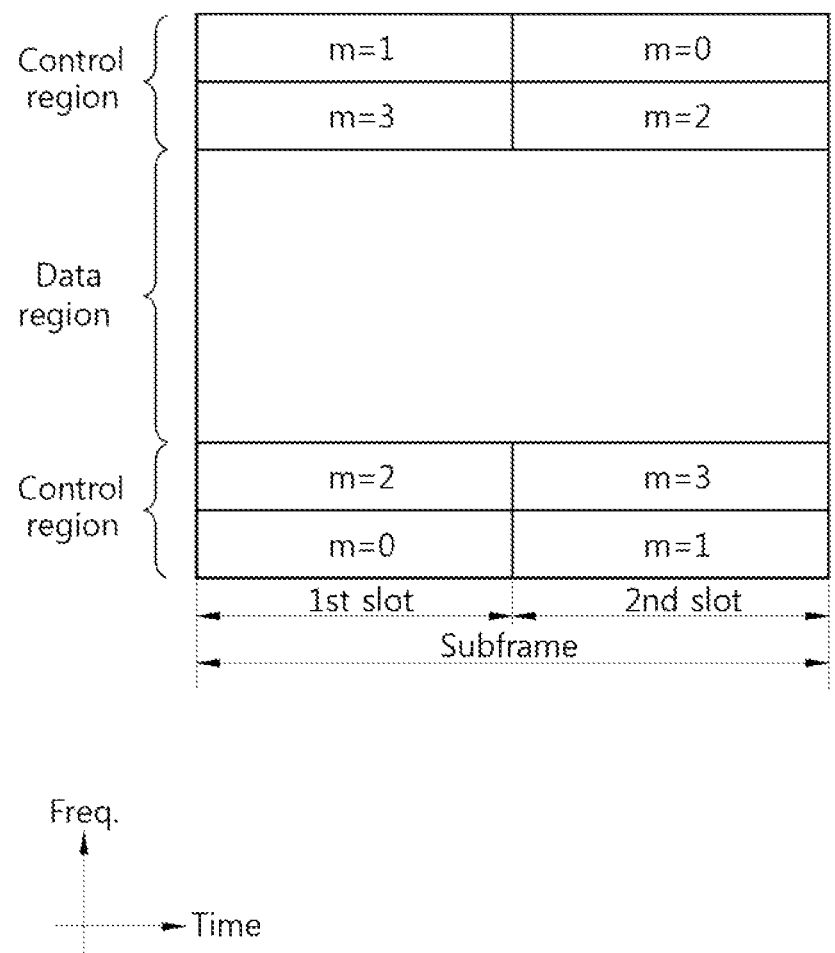
FIG. 5 shows the structure of an uplink subframe.

FIG. 5 shows the structure of an uplink subframe.

An uplink subframe may be divided into a control region and a data region in the frequency domain. A physical uplink control channel (PUCCH) for transmitting uplink control information is allocated to the control region. A physical uplink shared channel (PUCCH) for transmitting data is allocated to the data region. If indicated by a higher layer, the user equipment may support simultaneous transmission of the PUCCH and the PUSCH.

The PUSCH is mapped to a uplink shared channel (UL-SCH), a transport channel. Uplink data transmitted on the PUSCH may be a transport block, a data block for the UL-SCH transmitted during the TTI. The transport block may be user information. Or, the uplink data may be multiplexed data. The multiplexed data may be data obtained by multiplexing the transport block for the UL-SCH and control information. For example, control information multiplexed to data may include a channel quality indicator (CQI), a precoding matrix indicator (PMI), an HARQ, a rank indicator (RI), or the like. Or the uplink data may include only control information.

The following description is about a PUCCH.

The PUCCH for one UE is allocated in an RB pair. RBs belonging to the RB pair occupy different subcarriers in each of a $1^{st}$ slot and a $2^{nd}$ slot. A frequency occupied by the RBs belonging to the RB pair allocated to the PUCCH changes at a slot boundary. This is called that the RB pair allocated to the PUCCH is frequency-hopped at a slot boundary. Since the UE transmits UL control information over time through different subcarriers, a frequency diversity gain can be obtained. In the figure, m is a location index indicating a logical frequency-domain location of the RB pair allocated to the PUCCH in the subframe.

The PUCCH carries various types of control information according to a format. A PUCCH format 1 carries a scheduling request (SR). In this case, an on-off keying (OOK) scheme can be used. A PUCCH format 1a carries an acknowledgement/non-acknowledgement (ACK/NACK) modulated by using bit phase shift keying (BPSK) with respect to one codeword. A PUCCH format 1b carries an ACK/NACK modulated by using quadrature phase shift keying (QPSK) with respect to two codewords. A PUCCH format 2 carries a CQI modulated by using QPSK. PUCCH formats 2a and 2b carry CQI and ACK/NACK.

Table 1 shows a modulation scheme and the number of bits in a subframe according to a PUCCH format.

TABLE 1

| PUCCH format | Modulation scheme | Number of bits per subframe, $M_{bit}$ |
|---|---|---|
| 1 | N/A | N/A |
| 1a | BPSK | 1 |
| 1b | QPSK | 2 |
| 2 | QPSK | 20 |
| 2a | QPSK + BPSK | 21 |
| 2b | QPSK + QPSK | 22 |

Table 2 shows the number of OFDM symbols used as a PUCCH demodulation reference signal per slot.

TABLE 2

| PUCCH format | Normal cyclic prefix | Extended cyclic prefix |
|---|---|---|
| 1, 1a, 1b | 3 | 2 |
| 2 | 2 | 1 |
| 2a, 2b | 2 | N/A |

Table 3 shows a position of an OFDM symbol to which a demodulation reference signal is mapped according to a PUCCH format.

TABLE 3

| | set of values for l | |
|---|---|---|
| PUCCH format | Normal cyclic prefix | Extended cyclic prefix |
| 1, 1a, 1b | 2, 3, 4 | 2, 3 |
| 2, 2a, 2b | 1, 5 | 3 |

ACK/NACK signals can be transmitted by using different resources including different cyclic shift values and different Walsh/discrete Fourier transform (DFT) orthogonal codes by using a computer generated constant amplitude zero auto correlation (CG-CAZAC) sequence for each UE. If an available cyclic shift value is 6 and the number of Walsh/DFT codes is 3, 18 UEs having a signal antenna port can be multiplexed in one PRB.

Figure 6:
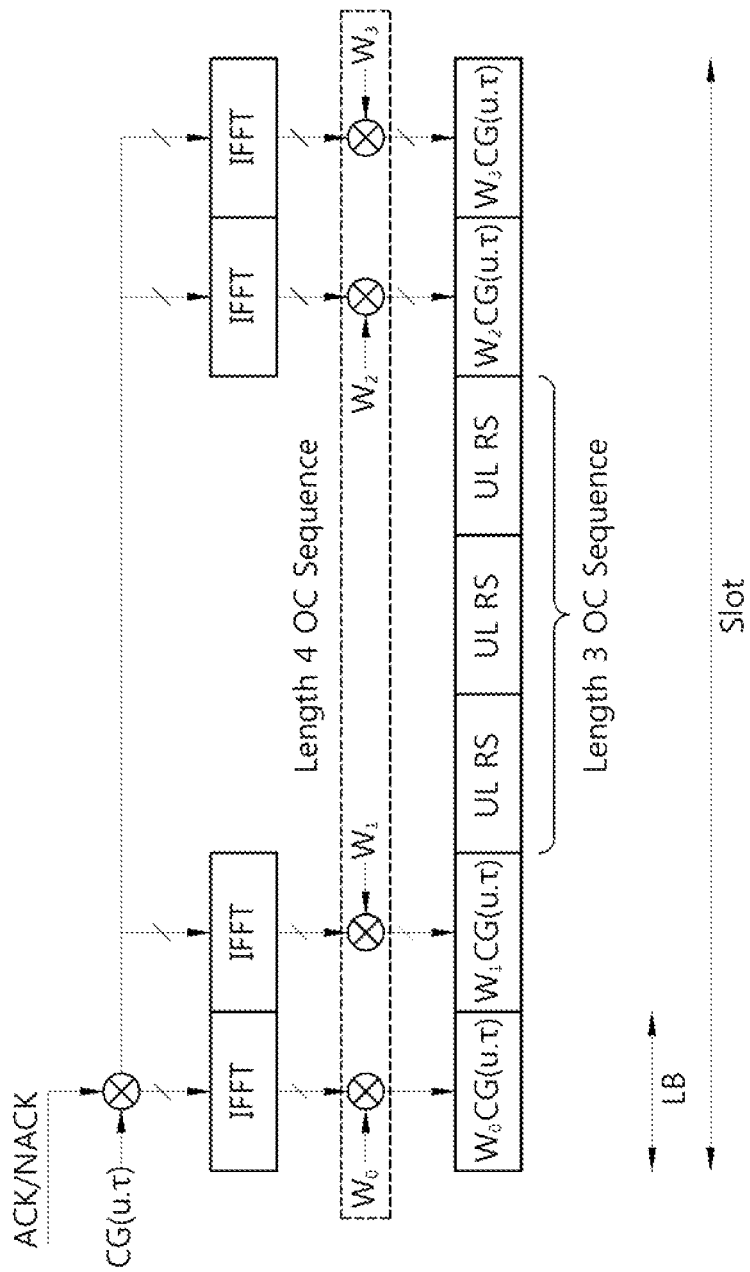
FIG. 6 shows a PUCCH format 1a/1b in a normal CP structure.

FIG. 6 shows a PUCCH format 1a/1b in a normal CP structure. Uplink reference signals are transmitted in $3^{rd}$ to $5^{th}$ SC-FDMA symbols. In FIG. 6, $w_0$, $w_1$, $w_2$ and $w_3$ can be modulated in a time domain after inverse fast Fourier transform (IFFT) modulation, or can be modulated in a frequency domain before IFFT modulation.

Figure 7:
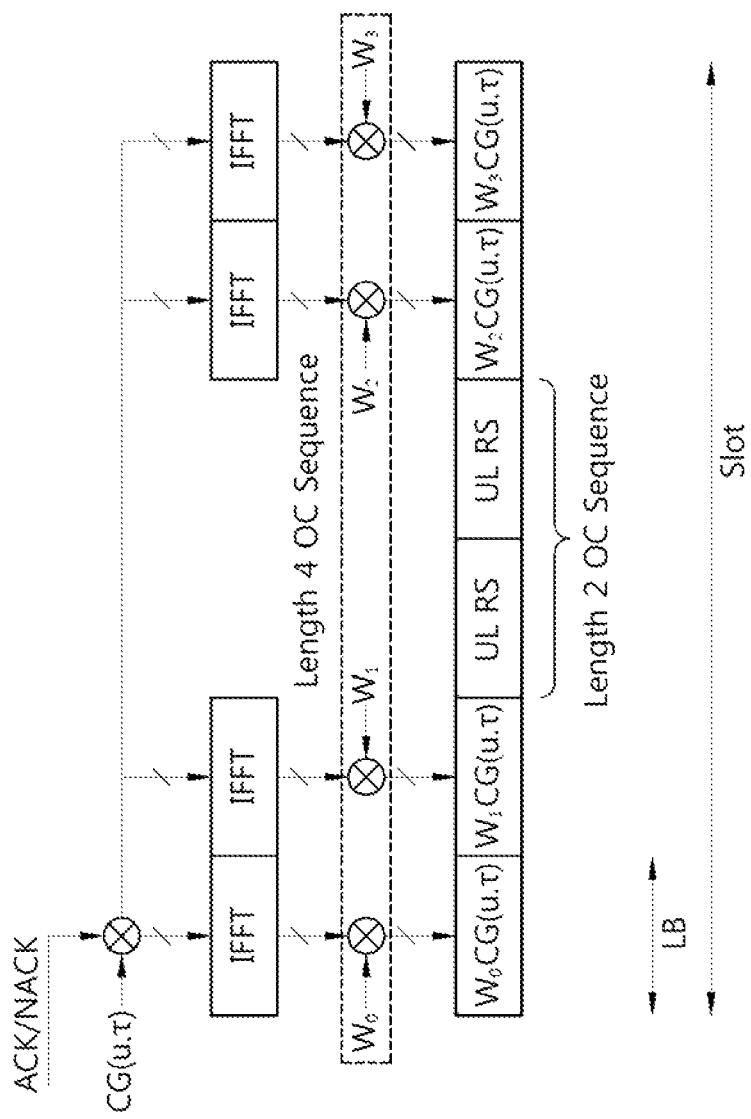
FIG. 7 shows a PUCCH format 1a/1b in an extended CP structure.

FIG. 7 shows a PUCCH format 1a/1b in an extended CP structure. Uplink reference signals are transmitted in $3^{rd}$ and $4^{th}$ SC-FDMA symbols. In FIG. 7, $w_0$, $w_1$, $w_2$ and $w_3$ can be modulated in a time domain after IFFT modulation, or can be modulated in a frequency domain before IFFT modulation.

An ACK/NACK resource including an SR, a cyclic shift assigned to the UE for persistent scheduling, a Walsh/DFT code, a PRB, or the like can be given by using RRC signaling. For non-persistent scheduling for dynamic ACK/NACK, the allocated resource can be given by a lowest CCE index of a PDCCH corresponding to a PDSCH for the ACK/NACK.

Table 4 is an example of an orthogonal sequence with a length of 4 for the PUCCH format 1/1a/1b.

TABLE 4

| Sequence index $n_{oc}(n_s)$ | Orthogonal sequences $[w(0) \ldots w(N_{SF}^{PUCCH} - 1)]$ |
|---|---|
| 0 | [+1 +1 +1 +1] |
| 1 | [+1 −1 +1 −1] |
| 2 | [+1 −1 −1 +1] |

Table 5 is an example of an orthogonal sequence with a length of 3 for the PUCCH format 1/1a/1b.

TABLE 5

| Sequence index $n_{oc}(n_s)$ | Orthogonal sequences $[w(0) \ldots w(N_{SF}^{PUCCH} - 1)]$ |
|---|---|
| 0 | [1 1 1] |
| 1 | [1 $e^{j2\pi/3}$ $e^{j4\pi/3}$] |
| 2 | [1 $e^{j4\pi/3}$ $e^{j2\pi/3}$] |

Table 6 is an example of an orthogonal sequence for reference signal transmission in the PUCCH format 1/1a/1b.

TABLE 6

| Sequence index $n_{oc2}(n_s)$ | Normal cyclic prefix | Extended cyclic prefix |
|---|---|---|
| 0 | [1 1 1] | [1 1] |
| 1 | [1 $e^{j2\pi/3}$ $e^{j4\pi/3}$] | [1 −1] |
| 2 | [1 $e^{j4\pi/3}$ $e^{j2\pi/3}$] | N/A |

Table 7 is an example of ACK/NACK channelization when $\Delta_{shift}^{PUCCH}=2$ in a normal CP structure.

TABLE 7

| Cell specific cyclic shift offset | | RS orthogonal cover | | | ACK/NACK orthogonal cover | | |
|---|---|---|---|---|---|---|---|
| $\delta_{offset}^{PUCCH}=1$ | $\delta_{offset}^{PUCCH}=0$ | $n_{OC}'=0$ | $n_{OC}'=1$ | $n_{OC}'=2$ | $n_{OC}=0$ | $n_{OC}=1$ | $n_{OC}=2$ |
| $n_{CS}=1$ | $n_{CS}=0$ | n' = 0 | | 12 | n' = 0 | | 12 |
| 2 | 1 | | 6 | | | 6 | |
| 3 | 2 | 1 | | 13 | 1 | | 13 |
| 4 | 3 | | 7 | | | 7 | |
| 5 | 4 | 2 | | 14 | 2 | | 14 |
| 6 | 5 | | 8 | | | 8 | |
| 7 | 6 | 3 | | 15 | 3 | | 15 |
| 8 | 7 | | 9 | | | 9 | |
| 9 | 8 | 4 | | 16 | 4 | | 16 |
| 10 | 9 | | 10 | | | 10 | |
| 11 | 10 | 5 | | 17 | 5 | | 17 |
| 0 | 11 | | 11 | | | 11 | |

In Table 7, $\Delta_{shift}^{PUCCH}$ is a cell-specific cyclic shift value of a CAZAC sequence, and may have any one of values 1 to 3 in a normal CP structure or an extended CP structure. $\delta_{offset}^{PUCCH}$ is a cell-specific cyclic shift offset, and may have any one of values 0 to $\Delta_{shift}^{PUCCH}-1$. Meanwhile, $n_{OC}$ is an index of an orthogonal sequence for ACK/NACK, and $n_{OC}'$ is an index of an orthogonal sequence for a reference signal. $n_{CS}$ is a cyclic shift value of a CAZAC sequence, and n' is an ACK/NACK resource index used for channelization in an RB.

Table 8 is an example of channelization of a structure in which a PUCCH format 1/1a/1b and a PUCCH format 2/2a/2b are mixed in a PRB.

TABLE 8

| | Orthogonal cover | | |
|---|---|---|---|
| Cyclic Shift | $OC_{index}=0$ | $OC_{index}=1$ | $OC_{index}=2$ |
| 0 | ACK/NACK | | |
| 1 | ACK/NACK | | |
| 2 | ACK/NACK | | |
| 3 | ACK/NACK | | |
| 4 | Guard shifts | | |
| 5 | CQI | | |
| 6 | CQI | | |
| 7 | CQI | | |
| 8 | CQI | | |

TABLE 8-continued

| | Orthogonal cover | | |
|---|---|---|---|
| Cyclic Shift | $OC_{index}=0$ | $OC_{index}=1$ | $OC_{index}=2$ |
| 9 | | CQI | |
| 10 | | CQI | |
| 11 | | Guard shifts | |

Referring to Table 8, cyclic shift values 0 to 3 for the PUCCH format 1/1a/1b are allocated, and cyclic shift values 5 to 10 for the PUCCH format 2/2a/2b are allocated. Cyclic shift values 4 and 11 between the PUCCH format 1/1a/1b and the PUCCH format 2/2a/2b are allocated as a guard shift.

Meanwhile, cyclic shift hopping can be performed on a symbol basis for inter-cell interference (ICI) randomization. In addition, for the ICI randomization, CS/orthogonal covering (OC) remapping can be performed between an ACK/NACK channel and a resource in a slot level.

A resource for the PUCCH format 1/1a/1b can consist of $n_{cs}$ indicating a cyclic shift in a symbol level, $n_o$, indicating orthogonal covering in a slot level, and $n_{RB}$ indicating a resource block in a frequency domain. $n_r$ can be defined as an index representing the PUCCH format 1/1a/1b resources $n_{cs}$, $n_{oc}$, $n_{RB}$. That is, $n_r=(n_{cs},n_{oc},n_{RB})$.

The PUCCH format 2/2a/2b can carry control information such as a CQI, a PMI, a RI, CQI+ACK/NACK, etc. A Reed-Muller (RM) channel coding scheme can be applied to the PUCCH format 2/2a/2b.

Table 9 shows an example of a (20,A) RM code used in channel coding of uplink control information (UCI) of 3GPP LTE. A bit-stream $a_0,a_1,a_2,\ldots,a_{A-1}$ is used as an input of a channel coding block using the (20,A) RM code of Table 9.

TABLE 9

| i | $M_{i,0}$ | $M_{i,1}$ | $M_{i,2}$ | $M_{i,3}$ | $M_{i,4}$ | $M_{i,5}$ | $M_{i,6}$ | $M_{i,7}$ | $M_{i,8}$ | $M_{i,9}$ | $M_{i,10}$ | $M_{i,11}$ | $M_{i,12}$ |
|---|---|---|---|---|---|---|---|---|---|---|---|---|---|
| 0 | 1 | 1 | 0 | 0 | 0 | 0 | 0 | 0 | 0 | 0 | 1 | 1 | 0 |
| 1 | 1 | 1 | 1 | 0 | 0 | 0 | 0 | 0 | 0 | 1 | 1 | 1 | 0 |
| 2 | 1 | 0 | 0 | 1 | 0 | 0 | 1 | 0 | 1 | 1 | 1 | 1 | 1 |
| 3 | 1 | 0 | 1 | 1 | 0 | 0 | 0 | 0 | 1 | 0 | 1 | 1 | 1 |
| 4 | 1 | 1 | 1 | 1 | 0 | 0 | 0 | 1 | 0 | 0 | 1 | 1 | 1 |
| 5 | 1 | 1 | 0 | 0 | 1 | 0 | 1 | 1 | 1 | 0 | 1 | 1 | 1 |
| 6 | 1 | 0 | 1 | 0 | 1 | 0 | 1 | 0 | 1 | 1 | 1 | 1 | 1 |
| 7 | 1 | 0 | 0 | 1 | 1 | 0 | 0 | 1 | 1 | 0 | 1 | 1 | 1 |
| 8 | 1 | 1 | 0 | 1 | 1 | 0 | 0 | 1 | 0 | 1 | 1 | 1 | 1 |
| 9 | 1 | 0 | 1 | 1 | 1 | 0 | 1 | 0 | 0 | 1 | 1 | 1 | 1 |
| 10 | 1 | 0 | 1 | 0 | 0 | 1 | 1 | 1 | 0 | 1 | 1 | 1 | 1 |
| 11 | 1 | 1 | 1 | 0 | 0 | 1 | 0 | 1 | 0 | 1 | 1 | 1 | 1 |
| 12 | 1 | 0 | 0 | 1 | 0 | 1 | 0 | 1 | 1 | 1 | 1 | 1 | 1 |
| 13 | 1 | 1 | 0 | 1 | 0 | 1 | 0 | 1 | 1 | 0 | 1 | 1 | 1 |
| 14 | 1 | 0 | 0 | 0 | 1 | 1 | 0 | 1 | 0 | 0 | 1 | 0 | 1 |

TABLE 9-continued

| i | $M_{i,0}$ | $M_{i,1}$ | $M_{i,2}$ | $M_{i,3}$ | $M_{i,4}$ | $M_{i,5}$ | $M_{i,6}$ | $M_{i,7}$ | $M_{i,8}$ | $M_{i,9}$ | $M_{i,10}$ | $M_{i,11}$ | $M_{i,12}$ |
|---|---|---|---|---|---|---|---|---|---|---|---|---|---|
| 15 | 1 | 1 | 0 | 0 | 1 | 1 | 1 | 1 | 0 | 1 | 1 | 0 | 1 |
| 16 | 1 | 1 | 1 | 0 | 1 | 1 | 1 | 0 | 0 | 1 | 0 | 1 | 1 |
| 17 | 1 | 0 | 0 | 1 | 1 | 1 | 0 | 0 | 1 | 0 | 0 | 1 | 1 |
| 18 | 1 | 1 | 0 | 1 | 1 | 1 | 1 | 1 | 0 | 0 | 0 | 0 | 0 |
| 19 | 1 | 0 | 0 | 0 | 0 | 1 | 1 | 0 | 0 | 0 | 0 | 0 | 0 |

Channel encoding bits $b_0, b_1, b_2, \ldots, b_{B-1}$ can be generated by Equation 1 below.

$$b_i = \sum_{n=0}^{A-1} (a_n \cdot M_{i,n}) \bmod 2 \quad <\text{Equation 1}>$$

In Equation 1, i=0, 1, 2, . . . , B−1.

Table 10 shows an example of a size of a CQI feedback UCI field for wideband reporting. Table 11 is a case where a single-antenna port is assumed, and transmit diversity or open-loop spatial multiplexing PDSCH transmission is assumed.

TABLE 10

| Field | Bitwidth |
|---|---|
| Wide-band CQI | 4 |

Table 11 is an example of a CQI and PMI feedback UCI field for wideband reporting. Table 11 is a case of closed-loop spatial multiplexing PDSCH transmission.

TABLE 11

| | Bitwidths | | | |
|---|---|---|---|---|
| | 2 antenna ports | | 4 antenna ports | |
| Field | Rank = 1 | Rank = 2 | Rank = 1 | Rank > 1 |
| Wide-band CQI | 4 | 4 | 4 | 4 |
| Spatial differential CQI | 0 | 3 | 0 | 3 |
| Precoding matrix indication | 2 | 1 | 4 | 4 |

Table 12 is an example of a size of an RI feedback UCI field for wideband reporting.

TABLE 12

| | Bitwidths | | |
|---|---|---|---|
| | | 4 antenna ports | |
| Field | 2 antenna ports | Max 2 layers | Max 4 layers |
| Rank indication | 1 | 1 | 2 |

In this case, $a_0$ and $a_{A-1}$ respectively denote a most significant bit (MSB) and a least significant bit (LSB). In the extended CP structure, A can be up to 11 except for a case where CQI and ACK/NACK are simultaneously transmitted. QPSK modulation can be applied to control information encoded into 20 bits by using an RM code. In addition, the encoded control information can be scrambled before QPSK modulation.

Figure 8:
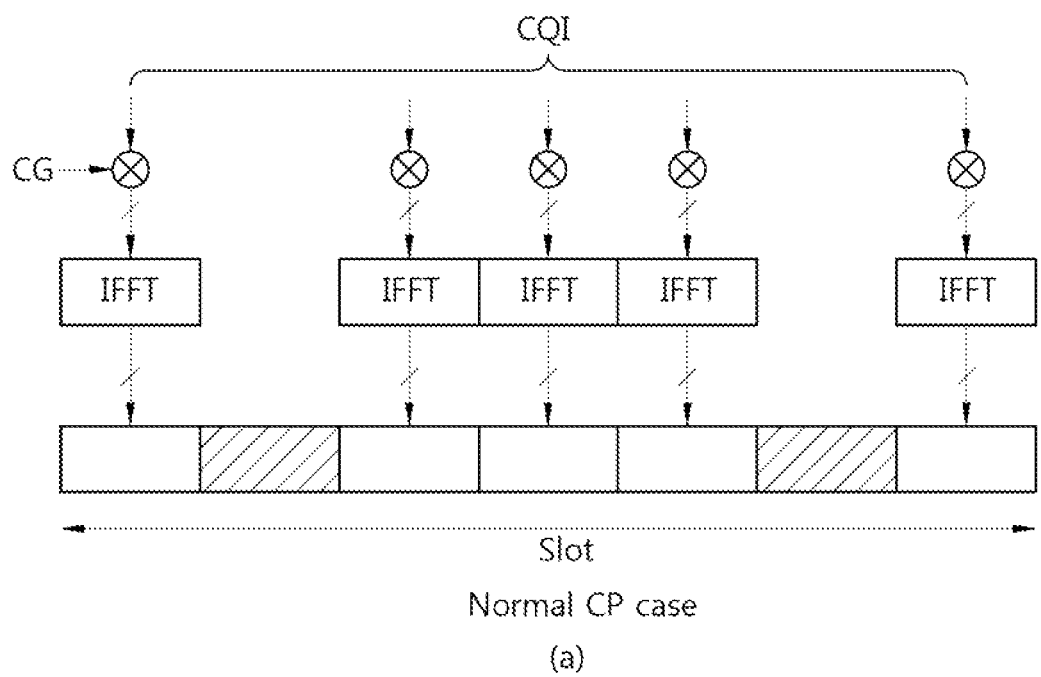
FIG. 8 shows a PUCCH format 2/2a/2b.
Figure 8:
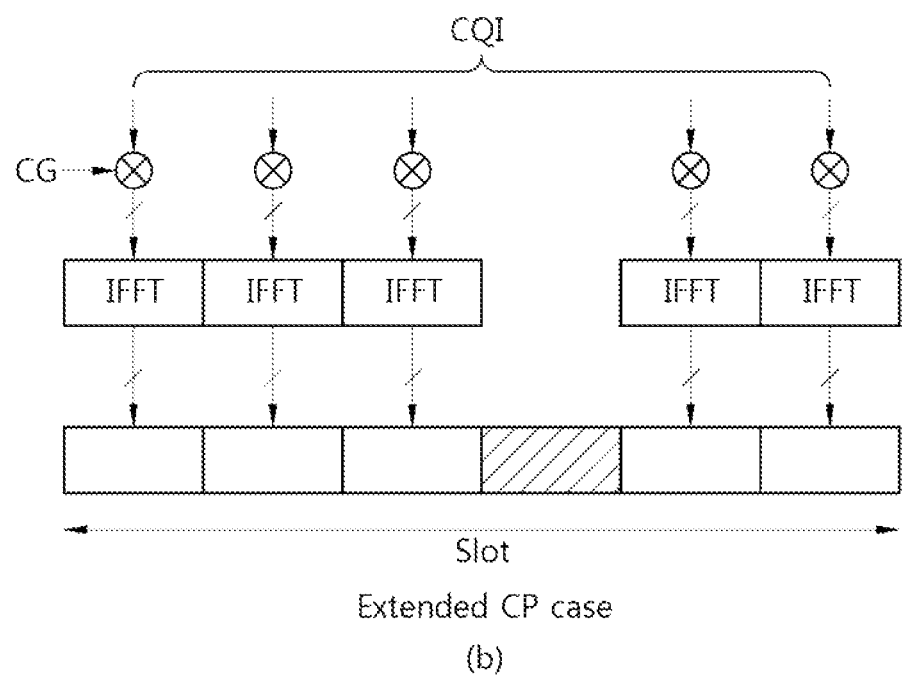

FIG. 8 shows a PUCCH format 2/2a/2b. FIG. 8(a) shows a normal CP structure, and FIG. 8(b) shows an extended CP structure. In FIG. 8(a), reference signals are transmitted in $2^{nd}$ and $6^{th}$ SC-FDMA symbols. In FIG. 8(b), reference signals are transmitted in a $4^{th}$ SC-FDMA symbol.

In a normal CP structure, one subframe includes 10 QPSK data symbols except for an SC-FDMA symbol for reference signal transmission. That is, each QPSK symbol can be spread by a cyclic shift in an SC-FDMA symbol level by using a 20-bit encoded CQI.

In addition, SC-FDMA symbol level cyclic shift hopping can be applied for ICI randomization. A reference signal can be multiplexed according to code division multiplexing (CDM) by using a cyclic shift. For example, if the number of available cyclic shift values is 12, 12 UEs can be multiplexed in one PRB. That is, each of a plurality of UEs in a PUCCH format 1/1a/1b and a PUCCH format 2/2a/2b can be multiplexed by using a cyclic shift/orthogonal covering/resource block and a cyclic shift/resource block.

A PRB used for PUCCH transmission in a slot $n_s$ can be determined by Equation 2.

$$n_{PRB} = \begin{cases} \left\lfloor \dfrac{m}{2} \right\rfloor & \text{if } (m+n_s \bmod 2) \bmod 2 = 0 \\ N_{RB}^{UL} - 1 - \left\lfloor \dfrac{m}{2} \right\rfloor & \text{if } (m+n_s \bmod 2) \bmod 2 = 1 \end{cases} \quad <\text{Equation 2}>$$

In Equation 2, $n_{PRB}$ denotes a PRB index. $N_{RB}^{UL}$ is an uplink bandwidth configuration expressed with a multiple of $N_{SC}^{RB}$. $N_{SC}^{RB}$ is a size of a resource block in a frequency domain and is expressed with the number of subcarriers. When the PRB is mapped to a PRB, the PUCCH can be mapped in the order of an outer PRB and an inner PRB. In addition, it can be mapped in the order of a PUCCH format 2/2a/2b, an ACK/NACK combination format, and a PUCCH format 1/1a/1b.

In the PUCCH format 1/1a/1b, m can be determined by Equation 3.

$$m = \quad <\text{Equation 3}>$$

$$\begin{cases} N_{RB}^{(2)} & \text{if } n_{PUCCH}^{(1)} < c \cdot N_{cs}^{(1)} / \Delta_{shift}^{PUCCH} \\ \left\lfloor \dfrac{n_{PUCCH}^{(1)} - c \cdot N_{cs}^{(1)} / \Delta_{shift}^{PUCCH}}{c \cdot N_{sc}^{RB} / \Delta_{shift}^{PUCCH}} \right\rfloor + N_{RB}^{(2)} + \left\lceil \dfrac{N_{cs}^{(1)}}{8} \right\rceil & \text{otherwise} \end{cases}$$

$$c = \begin{cases} 3 & \text{normal cyclic prefix} \\ 2 & \text{extended cyclic prefix} \end{cases}$$

In Equation 3, $N_{RB}^{(2)}$ denotes a bandwidth expressed with a resource block that can be used in the PUCCH format 2/2a/2b in each slot. $n_{PUCCH}^{(1)}$ denotes an index of a resource used for PUCCH format 1/1a/1b transmission. $N_{cs}^{(1)}$ denotes the number of cyclic shift values used for the PUCCH format 1/1a/1b in a resource block used in a mixed structure of the PUCCH format 1/1a/1b and format 2/2a/2b.

In the PUCCH format 2/2a/2b, m can be determined by Equation 4.

$$m = \lfloor n_{PUCCH}^{(2)} / N_{sc}^{RB} \rfloor \qquad <\text{Equation 4}>$$

In an LTE-A system, UL adopts an SC-FDMA transmission scheme. A transmission scheme in which IFFT is performed after DFT spreading is called SC-FDMA. SC-FDMA may also be called a discrete Fourier transform spread (DFT-s) OFDM. In SC-FDMA, the peak-to-average power ratio (PAPR) or a cubic metric (CM) may be lowered. If the SC-FDMA transmission scheme is used, transmission power efficiency in a UE having limited power consumption may be increased because the non-linear distortion period of a power amplifier may be avoided. Consequently, user throughput may be increased.

Figure 9:
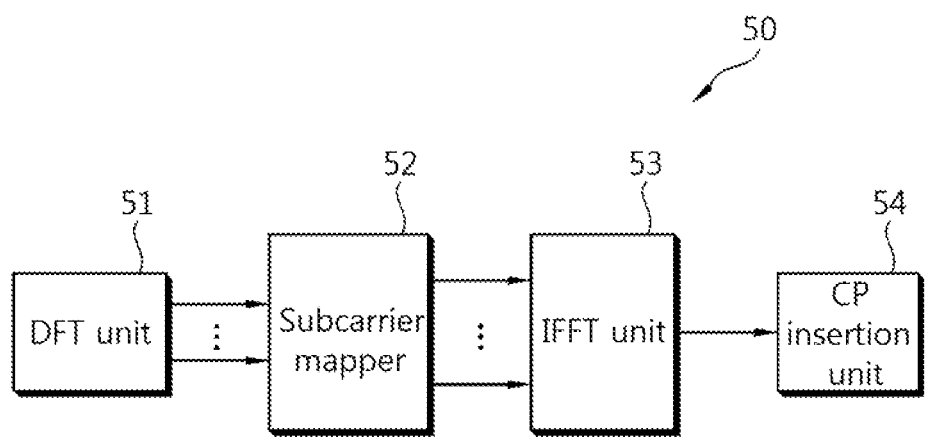
FIG. 9 shows an example of the structure of a transmitter in an SC-FDMA system.

FIG. 9 shows an example of the structure of a transmitter in an SC-FDMA system.

Referring to FIG. 9, the transmitter 50 includes a discrete Fourier transform (DFT) unit 51, a subcarrier mapper 52, an inverse fast Fourier transform (IFFT) unit 53, and a cyclic prefix (CP) insertion unit 54. The transmitter 50 may include a scramble unit (not shown), a modulation mapper (not shown), a layer mapper (not shown), and a layer permutator (not shown), which may be placed in front of the DFT unit 51.

The DFT unit 51 outputs complex-valued symbols by performing DFT on input symbols. For example, when Ntx symbols are input (where Ntx is a natural number), a DFT size is Ntx. The DFT unit 51 may be called a transform precoder. The subcarrier mapper 52 maps the complex-valued symbols to the respective subcarriers of the frequency domain. The complex-valued symbols may be mapped to resource elements corresponding to a resource block allocated for data transmission. The subcarrier mapper 52 may be called a resource element mapper. The IFFT unit 53 outputs a baseband signal for data (that is, a time domain signal) by performing IFFT on the input symbols. The CP insertion unit 54 copies some of the rear part of the baseband signal for data and inserts the copied parts into the former part of the baseband signal for data. Orthogonality may be maintained even in a multi-path channel because inter-symbol interference (ISI) and inter-carrier interference (ICI) are prevented through CP insertion.

Figure 10:
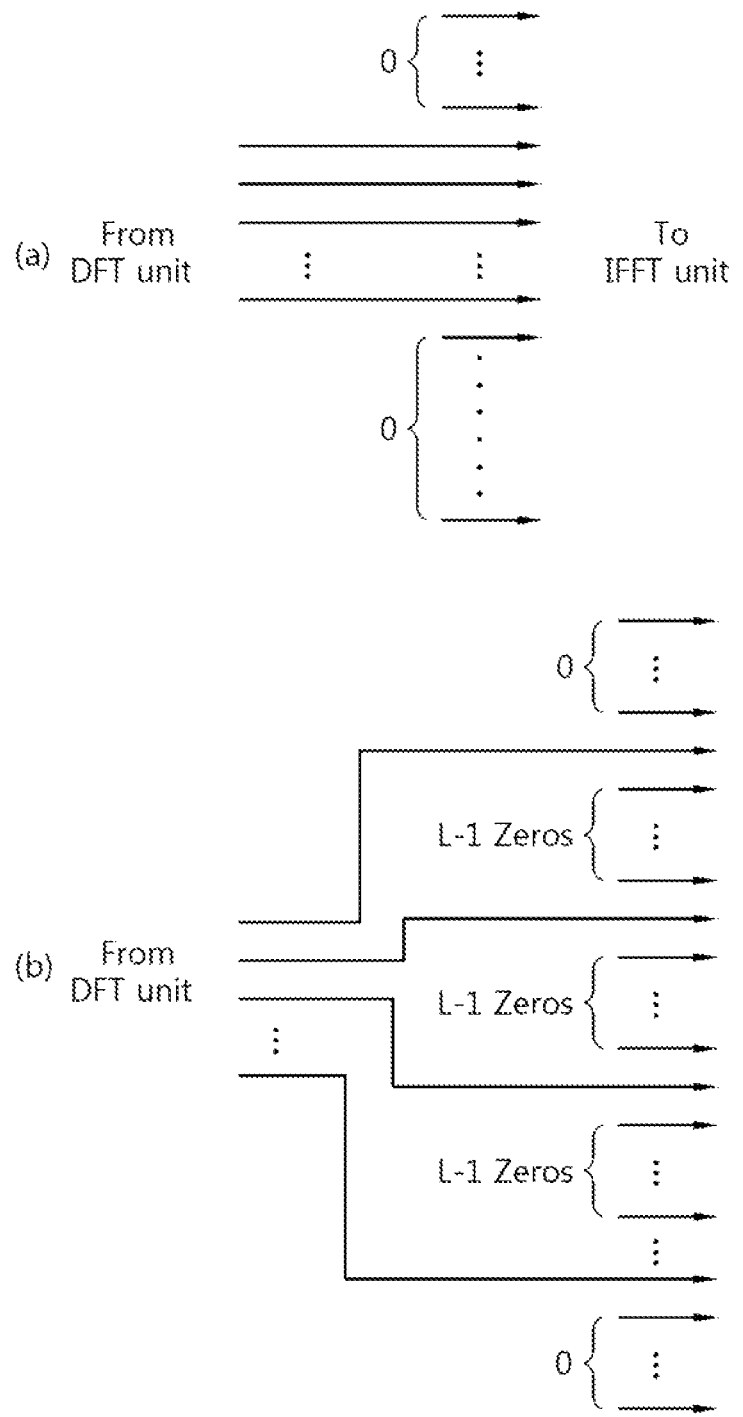
FIG. 10 shows an example of a scheme in which the subcarrier mapper maps the complex-valued symbols to the respective subcarriers of the frequency domain.

FIG. 10 shows an example of a scheme in which the subcarrier mapper maps the complex-valued symbols to the respective subcarriers of the frequency domain.

Referring to FIG. 10(a), the subcarrier mapper maps the complex-valued symbols, outputted from the DFT unit, to subcarriers contiguous to each other in the frequency domain. '0' is inserted into subcarriers to which the complex-valued symbols are not mapped. This is called localized mapping. In a 3GPP LTE system, a localized mapping scheme is used. Referring to FIG. 10(b), the subcarrier mapper inserts an (L−1) number of '0' every two contiguous complex-valued symbols which are outputted from the DFT unit (L is a natural number). That is, the complex-valued symbols outputted from the DFT unit are mapped to subcarriers distributed at equal intervals in the frequency domain. This is called distributed mapping. If the subcarrier mapper uses the localized mapping scheme as in FIG. 10(a) or the distributed mapping scheme as in FIG. 10(b), a single carrier characteristic is maintained.

A clustered DFT-s OFDM transmission scheme is a modification of the existing SC-FDMA transmission scheme and is a method of dividing data symbols, subjected to a precoder, into a plurality of subblocks, separating the subblocks, and mapping the subblocks in the frequency domain.

Figure 11:
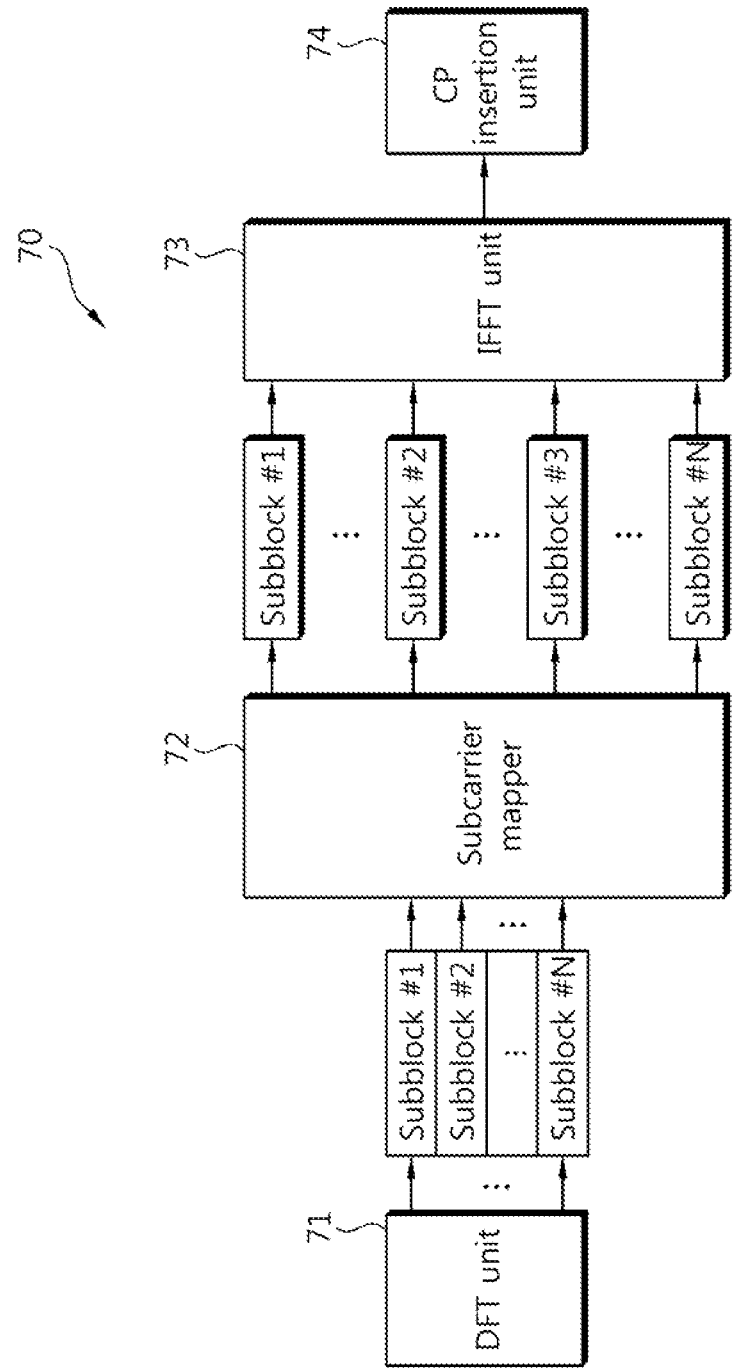
FIG. 11 shows an example of a transmitter using the clustered DFT-s OFDM transmission scheme.

FIG. 11 shows an example of a transmitter using the clustered DFT-s OFDM transmission scheme.

Referring to FIG. 11, the transmitter 70 includes a DFT unit 71, a subcarrier mapper 72, an IFFT unit 73, and a CP insertion unit 74. The transmitter 70 may further include a scramble unit (not shown), a modulation mapper (not shown), a layer mapper (not shown), and a layer permutator (not shown), which may be placed in front of the DFT unit 71.

Complex-valued symbols outputted from the DFT unit 71 are divided into N subblocks (N is a natural number). The N subblocks may be represented by a subblock #1, a subblock #2, . . . , a subblock #N. The subcarrier mapper 72 distributes the N subblocks in the frequency domain and maps the N subblocks to subcarriers. The NULL may be inserted every two contiguous subblocks. The complex-valued symbols within one subblock may be mapped to subcarriers contiguous to each other in the frequency domain. That is, the localized mapping scheme may be used within one subblock.

The transmitter 70 of FIG. 11 may be used both in a single carrier transmitter or a multi-carrier transmitter. If the transmitter 70 is used in the single carrier transmitter, all the N subblocks correspond to one carrier. If the transmitter 70 is used in the multi-carrier transmitter, each of the N subblocks may correspond to one carrier. Alternatively, even if the transmitter 70 is used in the multi-carrier transmitter, a plurality of subblocks of the N subblocks may correspond to one carrier. Meanwhile, in the transmitter 70 of FIG. 11, a time domain signal is generated through one IFFT unit 73. Accordingly, in order for the transmitter 70 of FIG. 11 to be used in a multi-carrier transmitter, subcarrier intervals between contiguous carriers in a contiguous carrier allocation situation must be aligned.

Figure 12:
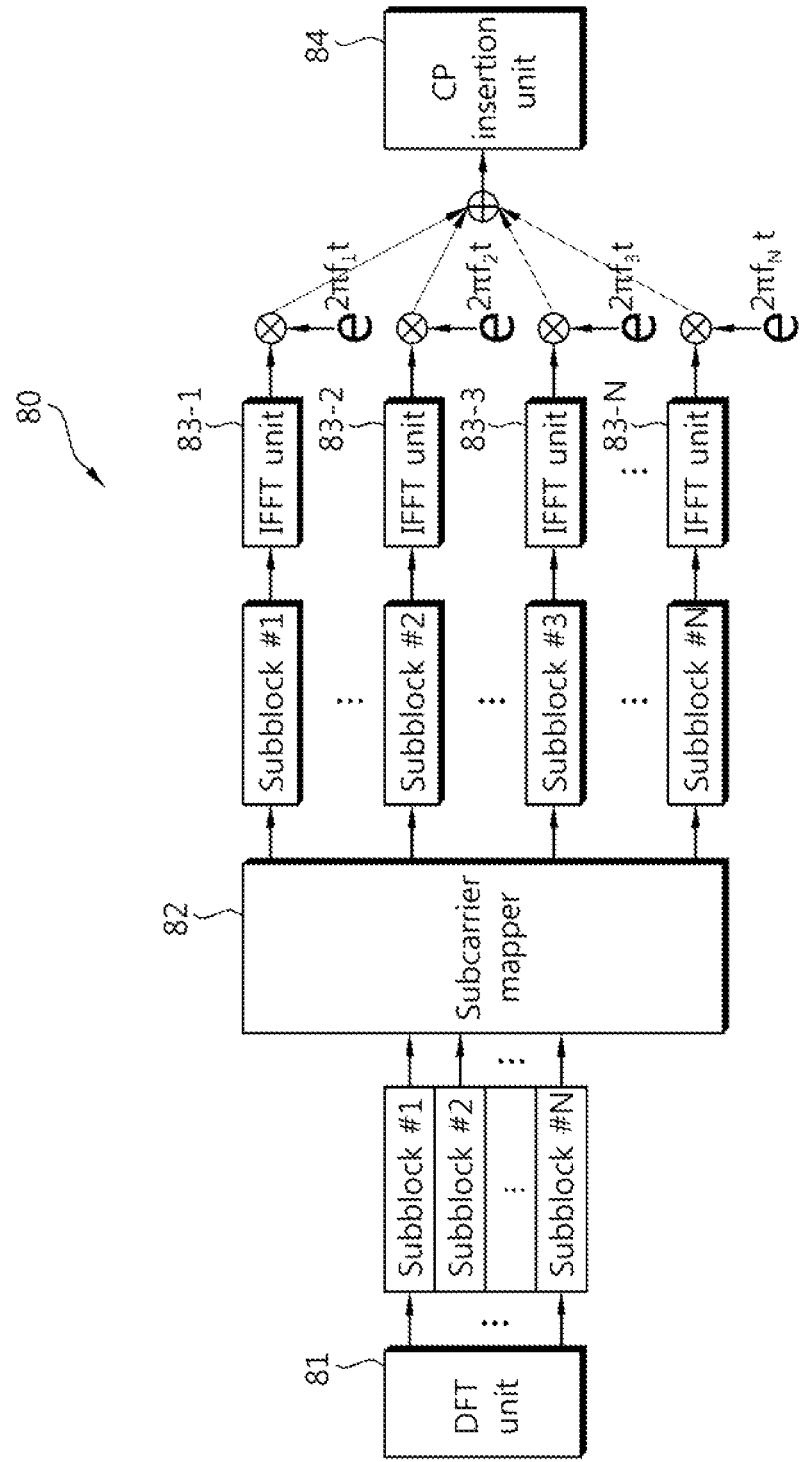
FIG. 12 shows another example of a transmitter using the clustered DFT-s OFDM transmission scheme.

FIG. 12 shows another example of a transmitter using the clustered DFT-s OFDM transmission scheme.

Referring to FIG. 12, the transmitter 80 includes a DFT unit 81, a subcarrier mapper 82, a plurality of IFFT units 83-1, 83-2, . . . , 83-N (N is a natural number), and a CP insertion unit 84. The transmitter 80 may further include a scramble unit (not shown), a modulation mapper (not shown), a layer mapper (not shown), and a layer permutator (not shown), which may be placed in front of the DFT unit 71.

IFFT is individually performed on each of N subblocks. An nth IFFT unit 83-n outputs an nth baseband signal (n=

1, 2, . . . , N) by performing IFFT on a subblock #n. The nth baseband signal is multiplied by an nth carrier signal to produce an nth radio signal. After the N radio signals generated from the N subblocks are added, a CP is inserted by the CP insertion unit 84. The transmitter 80 of FIG. 12 may be used in a discontinuous carrier allocation situation where carriers allocated to the transmitter are not contiguous to each other.

Figure 13:
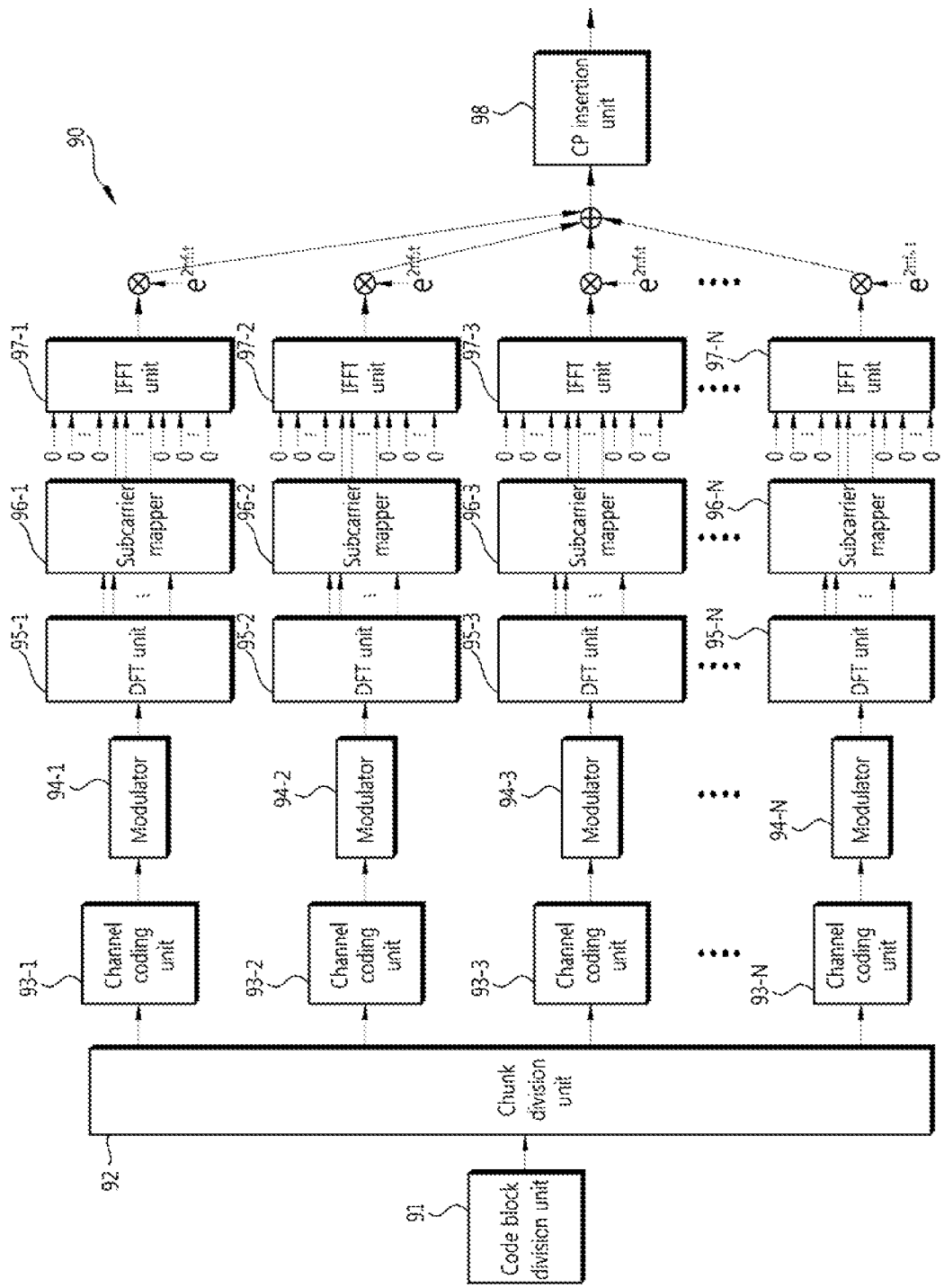
FIG. 13 shows another example of a transmitter using the clustered DFT-s OFDM transmission scheme.

FIG. 13 is another example of a transmitter using the clustered DFT-s OFDM transmission scheme.

FIG. 13 is a chunk-specific DFT-s OFDM system performing DFT precoding on a chunk basis. This may be called Nx SC-FDMA. Referring to FIG. 13, the transmitter 90 includes a code block division unit 91, a chunk division unit 92, a plurality of channel coding units 93-1, . . . , 93-N, a plurality of modulators 94-1, . . . , 94-N, a plurality of DFT units 95-1, . . . , 95-N, a plurality of subcarrier mappers 96-1, . . . , 96-N, a plurality of IFFT units 97-1, . . . , 97-N, and a CP insertion unit 98. Here, N may be the number of multiple carriers used by a multi-carrier transmitter. Each of the channel coding units 93-1, . . . , 93-N may include a scramble unit (not shown). The modulators 94-1, . . . , 94-N may also be called modulation mappers. The transmitter 90 may further include a layer mapper (not shown) and a layer permutator (not shown) which may be placed in front of the DFT units 95-1, . . . , 95-N.

The code block division unit 91 divides a transmission block into a plurality of code blocks. The chunk division unit 92 divides the code blocks into a plurality of chunks. Here, the code block may be data transmitted by a multi-carrier transmitter, and the chunk may be a data piece transmitted through one of multiple carriers. The transmitter 90 performs DFT on a chunk basis. The transmitter 90 may be used in a discontinuous carrier allocation situation or a contiguous carrier allocation situation.

Meanwhile, a 3GPP LTE-A system supports a carrier aggregation system. 3GPP TR 36.815 V9.0.0 (2010-3) may be incorporated herein by reference to describe the carrier aggregation system.

The carrier aggregation system implies a system that configures a wideband by aggregating one or more carriers having a bandwidth smaller than that of a target wideband when the wireless communication system intends to support the wideband. The carrier aggregation system can also be referred to as other terms such as a multiple carrier system, a bandwidth aggregation system, or the like. The carrier aggregation system can be divided into a contiguous carrier aggregation system in which carriers are contiguous to each other and a non-contiguous carrier aggregation system in which carriers are separated from each other. In the contiguous carrier aggregation system, a guard band may exist between carriers. A carrier which is a target when aggregating one or more carriers can directly use a bandwidth that is used in the legacy system in order to provide backward compatibility with the legacy system. For example, a 3GPP LTE system can support a bandwidth of 1.4 MHz, 3 MHz, 5 MHz, 10 MHz, 15 MHz, and 20 MHz, and a 3GPP LTE-A system can configure a wideband of 20 MHz or higher by using only the bandwidth of the 3GPP LTE system. Alternatively, the wideband can be configured by defining a new bandwidth without having to directly use the bandwidth of the legacy system.

In the carrier aggregation system, a UE can transmit or receive one or a plurality of carriers simultaneously according to capacity. An LTE-A UE can transmit or receive a plurality of carriers simultaneously. An LTE Rel-8 UE can transmit or receive only one carrier when each of carriers constituting the carrier aggregation system is compatible with an LTE Rel-8 system. Therefore, when the number of carriers used in the uplink is equal to the number of carriers used in the downlink, it is necessary to configure such that all CCs are compatible with the LTE Rel-8 system.

In order to efficiently use the plurality of carriers, the plurality of carriers can be managed in a media access control (MAC). To transmit/receive the plurality of carriers, a transmitter and a receiver both have to be able to transmit/receive the plurality of carriers.

Figure 14:
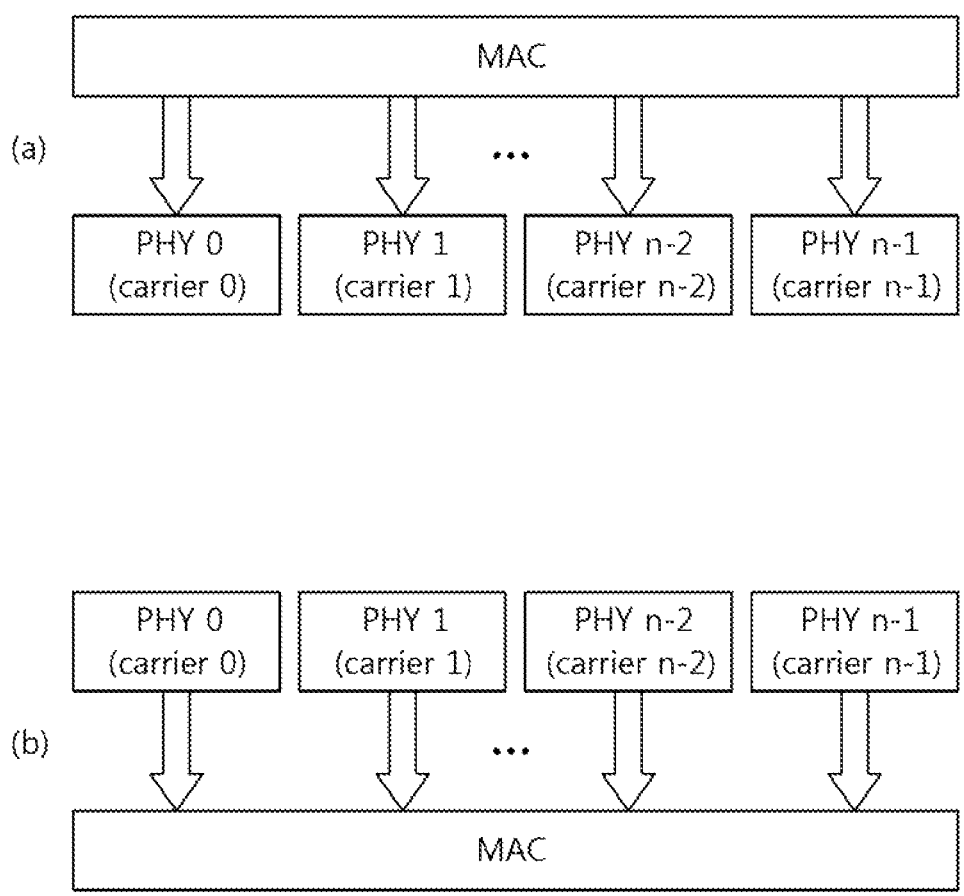
FIG. 14 shows an example of a transmitter and a receiver which constitute a carrier aggregation system.

FIG. 14 shows an example of a transmitter and a receiver which constitute a carrier aggregation system.

In the transmitter of FIG. 14(a), one MAC transmits and receives data by managing and operating all of n carriers. This is also applied to the receiver of FIG. 14(b). From the perspective of the receiver, one transport block and one HARQ entity may exist per CC. A UE can be scheduled simultaneously for a plurality of CCs. The carrier aggregation system of FIG. 14 can apply both to a contiguous carrier aggregation system and a non-contiguous carrier aggregation system. The respective carriers managed by one MAC do not have to be contiguous to each other, which results in flexibility in terms of resource management.

Figure 15:
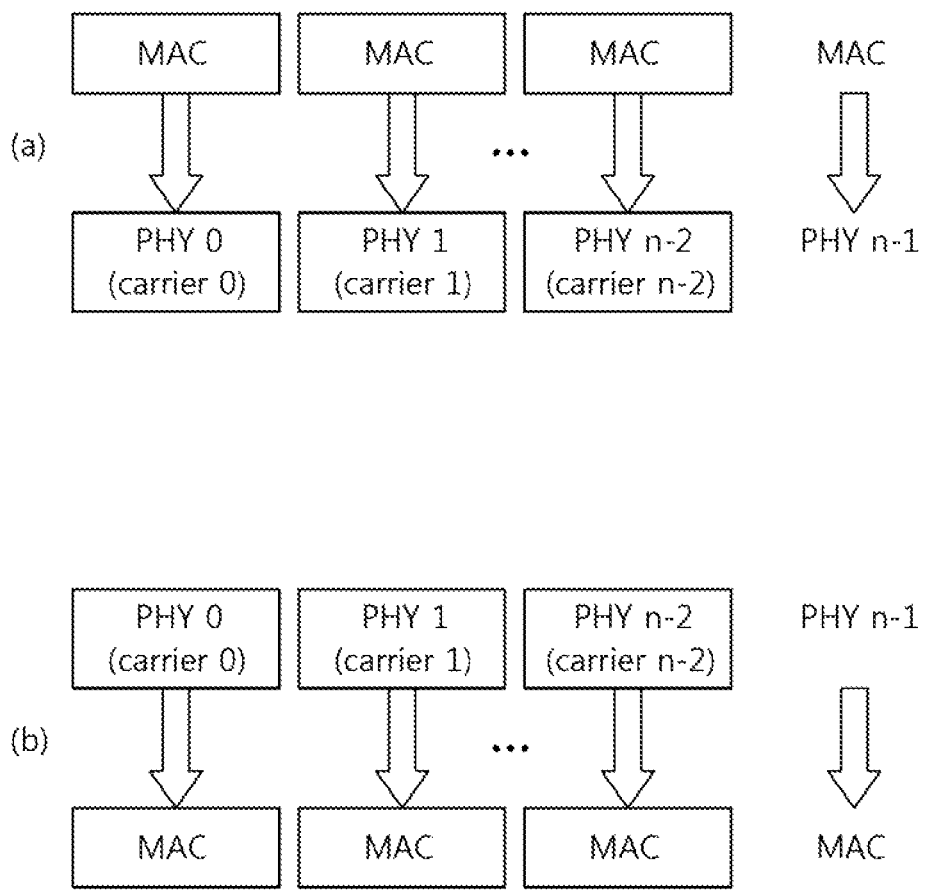
FIGS. 15 and 16 show another example of a transmitter and a receiver which constitute a carrier aggregation system.
Figure 16:
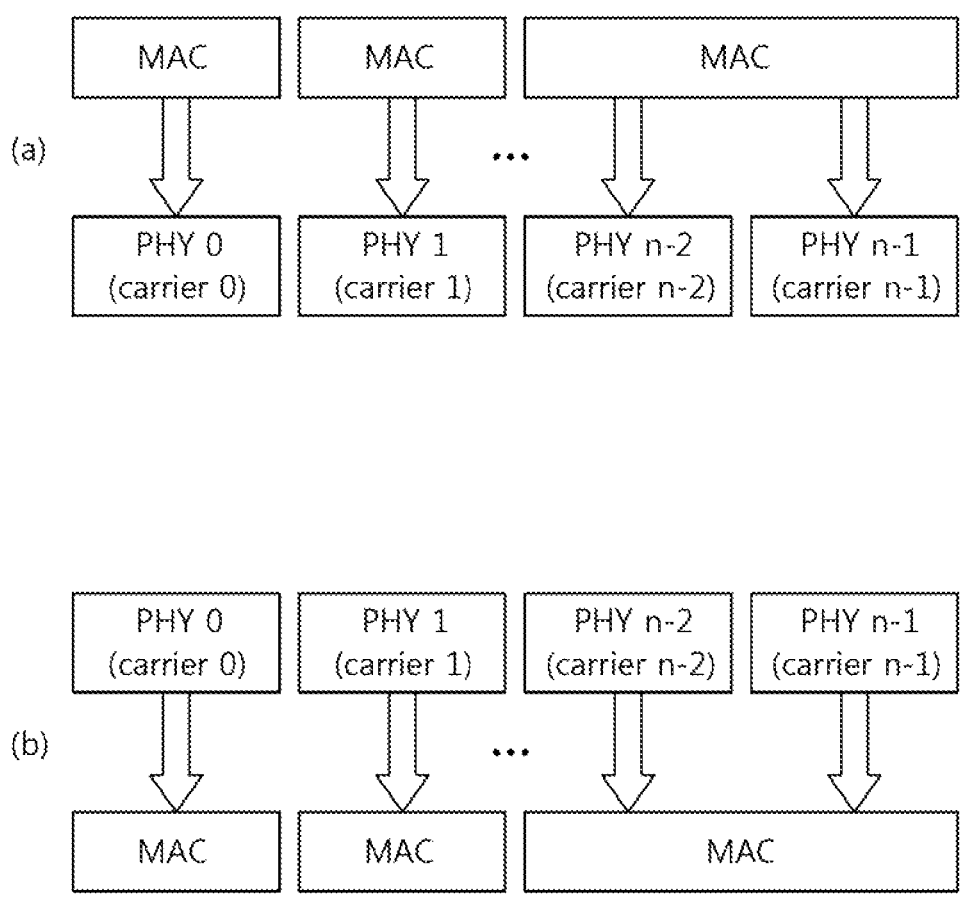

FIG. 15 and FIG. 16 are other examples of a transmitter and a receiver which constitute a carrier aggregation system.

In the transmitter of FIG. 15(a) and the receiver of FIG. 15(b), one MAC manages only one carrier. That is, the MAC and the carrier are 1:1 mapped. In the transmitter of FIG. 16(a) and the receiver of FIG. 16(b), a MAC and a carrier are 1:1 mapped for some carriers, and regarding the remaining carriers, one MAC controls a plurality of CCs. That is, various combinations are possible based on a mapping relation between the MAC and the carrier.

The carrier aggregation system of FIG. 14 to FIG. 16 includes n carriers. The respective carriers may be contiguous to each other or may be separated from each other. The carrier aggregation system can apply both to uplink and downlink transmissions. In a TDD system, each carrier is configured to be able to perform uplink transmission and downlink transmission. In an FDD system, a plurality of CCs can be used by dividing them for an uplink usage and a downlink usage. In a typical TDD system, the number of CCs used in uplink transmission is equal to that used in downlink transmission, and each carrier has the same bandwidth. The FDD system can configure an asymmetric carrier aggregation system by allowing the number of carriers and the bandwidth to be different between uplink and downlink transmissions.

Meanwhile, from a perspective of a UE, there is one transport block and one hybrid automatic repeat request (HARQ) entity per scheduled component carrier. Each transport block is mapped to only a single component carrier. The UE can be simultaneously mapped to multiple component carriers.

Figure 17:
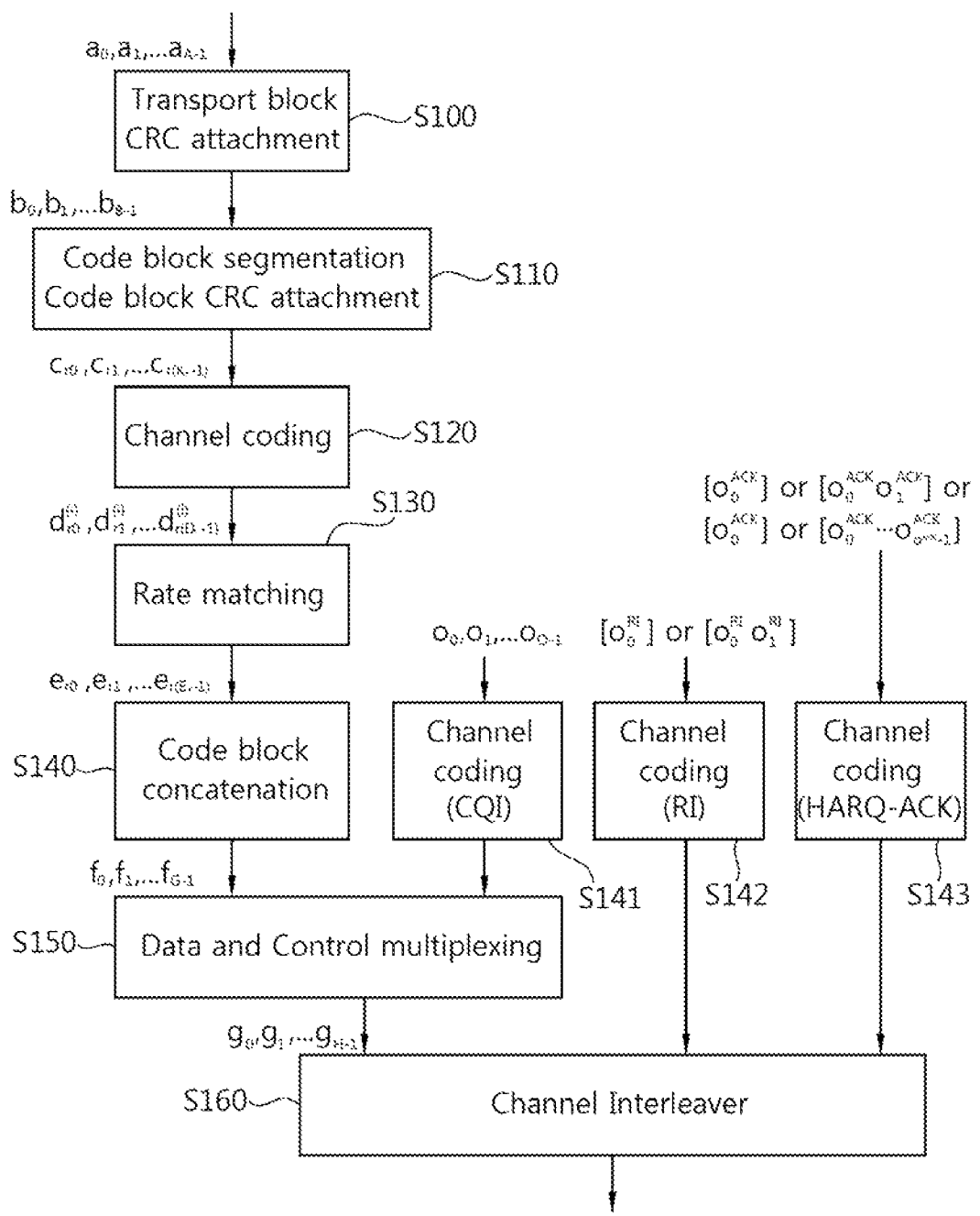
FIG. 17 is an example of the processing process of an Uplink Shared Channel (UL-SCH) transport channel.

FIG. 17 is an example of the processing process of an uplink shared channel (UL-SCH) transport channel. Data reaches a coding unit in the form of a maximum of one transport block per transmit time interval (TTI). The processing process of the UL-SCH transport channel shown in FIG. 17 may be applied to each of the UL-SCH transport channels of each uplink cell.

Referring to FIG. 17, at step S100, a cyclic redundancy check (CRC) is attached to a transport block. When the CRC is attached, error detection can be supported. The size of the transport block may be A, the size of a parity bit may be L, and B=A+L.

At step S110, the transport block to which the CRC has been attached is segmented into a plurality of code blocks, and a CRC is attached to each of the code blocks. The size of each of the code blocks may be represented by Kr, and r is a code block number.

At step S120, channel coding is performed on each code block. Here, the channel coding may be performed using a turbo coding scheme. Since the coding rate of the turbo coding scheme is 1/3, three coded streams are generated and each coded stream having the code block number of r has a size of Dr.

At step S130, the rate matching is performed on each code block on which the channel coding has been performed. When the code block number is r, the number of bits on which the rate matching has been performed may be represented by Er.

At step S140, the code blocks on which the rate matching has been performed are concatenated. G is the total number of bits in which the code blocks are concatenated. In the total number of bits, bits used to transmit control information are excluded from a given transport block on an $N_L$ transport layer. Here, the control information may be multiplexed with UL-SCH transmission.

At steps S141 to S143, the channel coding is performed on control information. The control information may include CQI and/or CQI including a PMI, an HARQ-acknowledgement (ACK), and an RI. Or it is hereinafter assumed that the CQI includes a PMI. A different coding rate is applied to each piece of control information depending on the number of different coding symbols. When the control information is transmitted through a PUSCH, channel coding on CQI, channel coding on an RI, and channel coding on HARQ-ACK are independently performed. In the present embodiment, it is assumed that the CQI is subject to channel coding at step S141, the RI is subject to channel coding at step S142, and the HARQ-ACK is subject to channel coding at step S143, but not limited thereto.

At step S150, multiplexing is performed on data and the control information. Here, the HARQ-ACK information exist both in two slots of a subframe, and it may be mapped to resources adjacent to a demodulation reference signal (DMRS). The data and the control information can be mapped to different modulation symbols by multiplexing the data and the control information. Meanwhile, if one or more UL-SCH transport blocks are transmitted in the subframe of an uplink cell, CQI information can be multiplexed with data on an UL-SCH transport block having the highest modulation and coding scheme (MCS).

At step S160, channel interleaving is performed on. The channel interleaving may be performed in connection with PUSCH resource mapping. Modulation symbols may be subject to time first mapping to a transmission waveform through the channel interleaving. HARQ-ACK information may be mapped to resources adjacent to an uplink DRMS, and RI information may be mapped to the periphery of resources used by the HARQ-ACK information.

Figure 18:
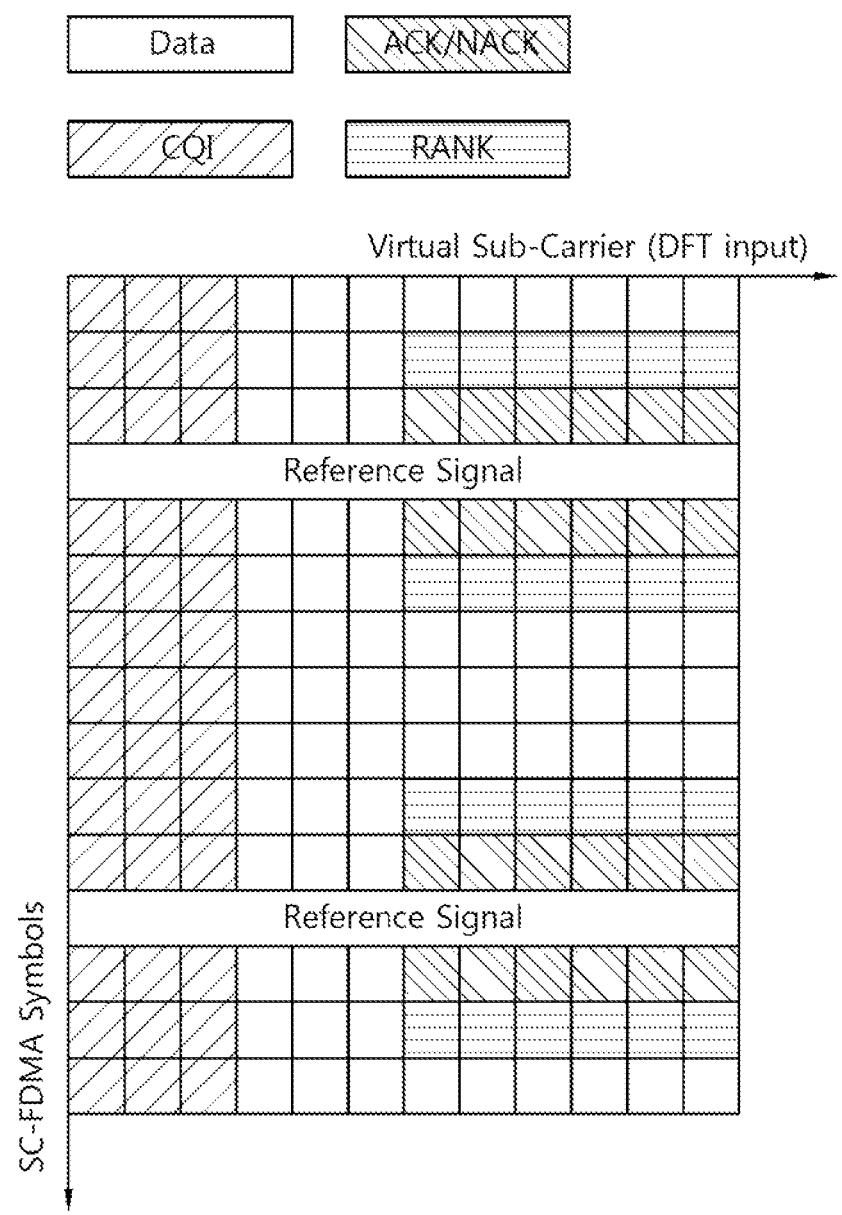
FIG. 18 is an example of physical resource elements to which data channels and control channels are mapped in 3GPP LTE.

FIG. 18 is an example of physical resource elements to which data channels and control channels are mapped in 3GPP LTE. A horizontal axis indicates a virtual subcarrier, that is, the input of a discrete Fourier transform (DFT), and a vertical axis indicates an SC-FDMA symbol. A reference signal is mapped in the fourth SC-FDMA symbol of each slot. Data and CQI are mapped in a time-first manner. Data and CQI may be multiplexed in a serial connection manner. Encoded HARQ-ACK is mapped to an SC-FDMDA symbol at the side of an SC-FDMA symbol to which the reference signal has been mapped. Resources used for the HARQ-ACK may be placed in the last part of the virtual subcarrier. An RI may be subject to rate matching to the side of a resource element to which the HARQ-ACK has been mapped irrespective of whether the HARQ-ACK is transmitted or not. The number of SC-FDMA symbols to which the HARQ-ACK and the RI are mapped may be a maximum of 4.

An extended PUCCH format is described below. In one configuration carrier according to the FDD transmission scheme of LTE rel-8, ACK/NACK information having a maximum of 2 bits is transmitted through a PUSCH or PUCCH according to a BPSK or QPSK modulation scheme. The extended PUCCH format may replace the PUCCH formats 1/1a/1b or 2/2a/2b of LTE Rel-8 in order to transmit more payload in a carrier aggregation system.

Figure 19:
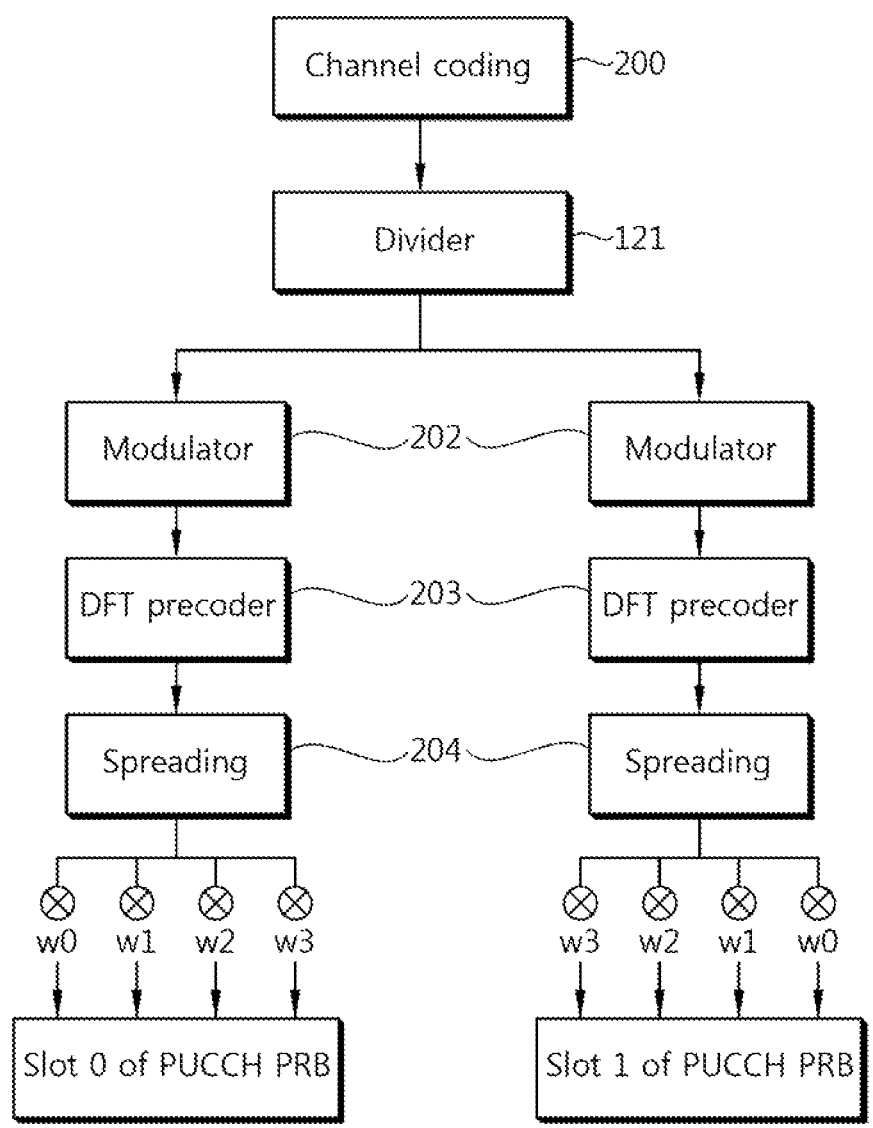
FIG. 19 is an example of an extended PUCCH format.

FIG. 19 is an example of an extended PUCCH format. The extended PUCCH format of FIG. 19 may be a PUCCH format to which a DFT-s OFDM transmission scheme is applied. Although the extended PUCCH format of FIG. 19 is not limited to a specific PUCCH format, in order to facilitate explanation, the following description will be based on a normal CP structure of a PUCCH format 1 for carrying ACK/NACK. The extended PUCCH format is also applicable to PUCCH formats 2/2a/2b for UCI transmission such as CQI/PMI/RI. That is, the extended PUCCH format is applicable to any control information. For example, it is possible to use the extended PUCCH format proposed to support a 13 (or higher)-bit payload in the PUCCH format 2 supporting up to a 13-bit payload.

Referring to FIG. 19, channel coding is performed on an information bit (e.g., ACK/NACK, etc.) for each component carrier (step 200). The channel coding may be any one of various types of coding schemes, such as simple repetition, simplex coding, RM coding, punctured RM coding, TBCC, LDPC coding, or turbo coding. An encoding information bit generated as a result of channel coding can be rate-matched by considering a modulation symbol order to be applied and a resource to be mapped. For inter-cell interface (ICI) randomization for the generated encoding information bit, cell-specific scrambling using a scrambling code corresponding to a cell identifier (ID) or UE-specific scrambling using a scrambling code corresponding to a UE ID (e.g., a radio network temporary identifier (RNTI)) can be used.

The encoding information bit is distributed to each slot via a divider (step 201). The encoding information bit can be distributed to two slots in various manners. For example, a first part of the encoding information bit can be distributed to a first slot, and a last part of the encoding information bit can be distributed to a second slot. Alternatively, by using an interleaving scheme, an even encoding information bit can be distributed to the first slot, and an odd encoding information bit can be distributed to the second slot. The encoding information bit distributed to each slot is modulated via a modulator (step 201). A QPSK symbol can be generated by modulating the encoding information bit. Meanwhile, the modulator and the divider may be placed in a reverse order.

DFT precoding is performed on QPSK symbols in each slot to generate a single carrier waveform in each slot (step 203). In addition to the DFT precoding, an operation of Walsh precoding or the like corresponding thereto can be performed. However, it is assumed hereinafter that the DFT precoding is performed unless specified otherwise.

Time spreading is performed with an SC-FDMA symbol level on QPSK symbols for which DFT precoding is performed, by using an orthogonal code having an index m which is predetermined or determined through dynamic signaling or radio resource control (RRC) signaling (step 204). The orthogonal code of the index m can be expressed by $w_m=[w_0\ w_1\ w_2\ w_3]$ if a spreading factor (SF) is 4. If the orthogonal code is a Walsh code and the SF is 4, it can be expressed by $w_0=[1\ 1\ 1\ 1]$, $w_1=[1\ -1\ 1\ -1]$, $w_2=[1\ 1\ -1\ -1]$, $w_3=[1\ -1\ -1\ 1]$. If the orthogonal code is a DFT code, it can be expressed by $w_m=[w_0\ w_1\ \ldots\ w_{k-1}]$, where $w_k=\exp(j2\pi km/SF)$. In addition, another code other than the Walsh code and the DFT code may be used as the orthogonal code. The SF implies a factor by which data is spread, and can be related to the number of UEs to be multiplexed or the number of antennas. The SF may vary depending on a system, and may be predetermined or may be reported to the UE through DCI or RRC signaling. In addition, the orthogonal code applied with the SC-FDMA symbol level can be applied by changing an index in a slot level. That is, the orthogonal code can be hopped in the slot level.

A signal generated as described above is mapped to a subcarrier in a PRB, is then converted into a signal of a time domain by inverse fast Fourier transform (IFFT), and is transmitted via a radio frequency (RF) unit by attaching a cyclic prefix (CP).

Figure 20:
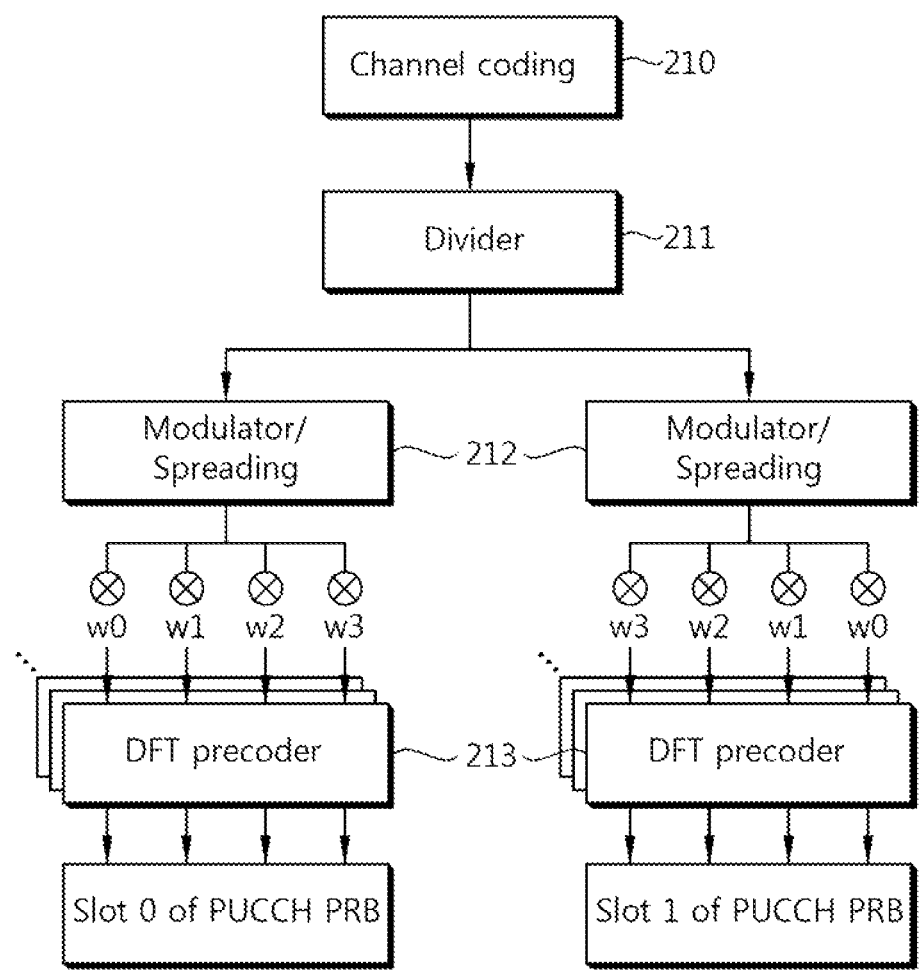
FIG. 20 is another example of the extended PUCCH format.

FIG. 20 is another example of an extended PUCCH format. Referring to FIG. 20, channel coding is performed on an information bit such as ACK/NACK for each component carrier (step 210), and the encoding information bit is distributed to each slot via a divider (step 211). The encoding information bit distributed to each slot is modulated via a modulator, and a QPSK symbol generated as a result of modulation is time-spread by an orthogonal code of an index m (step 212). If SF=4, the orthogonal code of the index m can be expressed by $w_m=[w_0\ w_1\ w_2\ w_3]$. DFT precoding is performed with an SC-FDMA level on time-spread QPSK symbols (step 213), and a signal generated in this manner is mapped to a subcarrier in a PRB. That is, the extended PUCCH format of FIG. 20 is different from the extended PUCCH format of FIG. 19 in a sense that time spreading is performed before DFT precoding.

Figure 21:
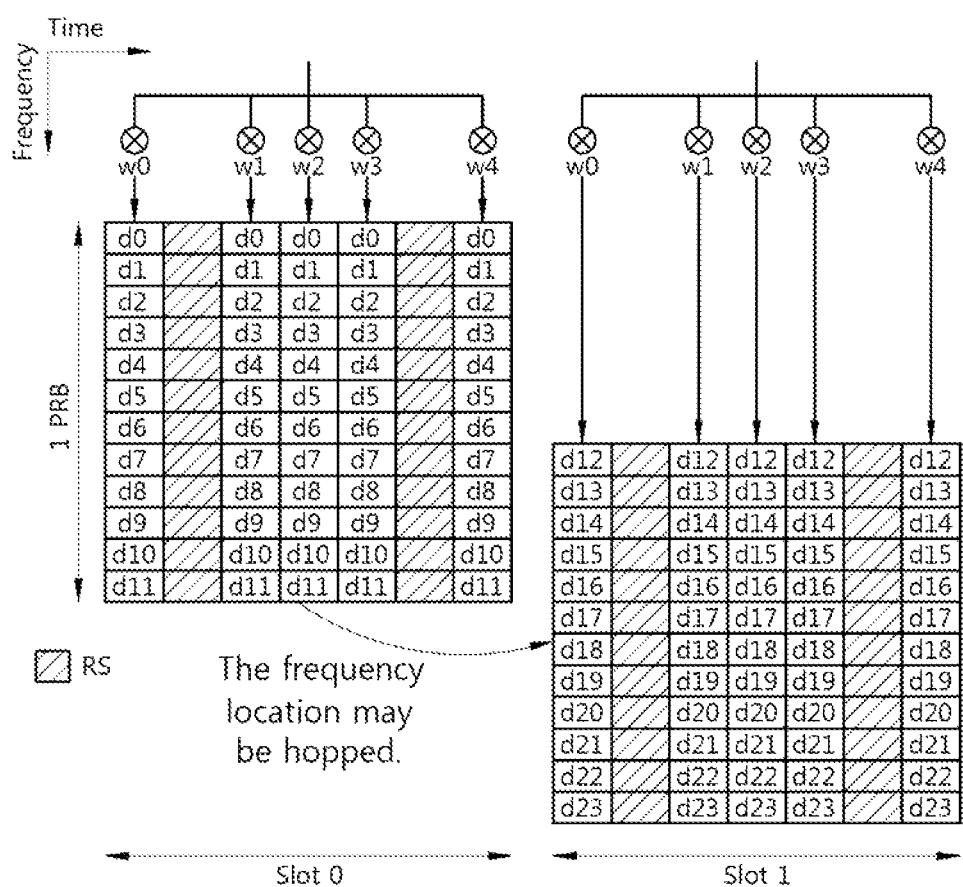
FIG. 21 is an example of time spreading for modulated QPSK symbols in the extended PUCCH format.

FIG. 21 is an example of time spreading for a modulated QPSK symbol with an extended PUCCH format. A case where a QPSK symbol is time-spread in a normal CP is shown in FIG. 21. Referring to FIG. 21, the QPSK symbol is time-spread across 5 SC-FDMA symbols in one slot. A reference signal is mapped to $2^{nd}$ and $6^{th}$ SC-FDMA symbols in each slot. This is the same position to which a reference signal is mapped in PUCCH formats 2/2a/2b in LTE rel-8. When the QPSK symbol is time-spread, an orthogonal code having an index m which is predetermined or determined through dynamic signaling or RRC signaling can be used. If SF=5, the orthogonal code having the index m can be expressed by $w_m=[w_0\ w_1\ w_2\ w_3\ w_4]$. In addition, the orthogonal code can be hopped in a slot level.

Figure 22:
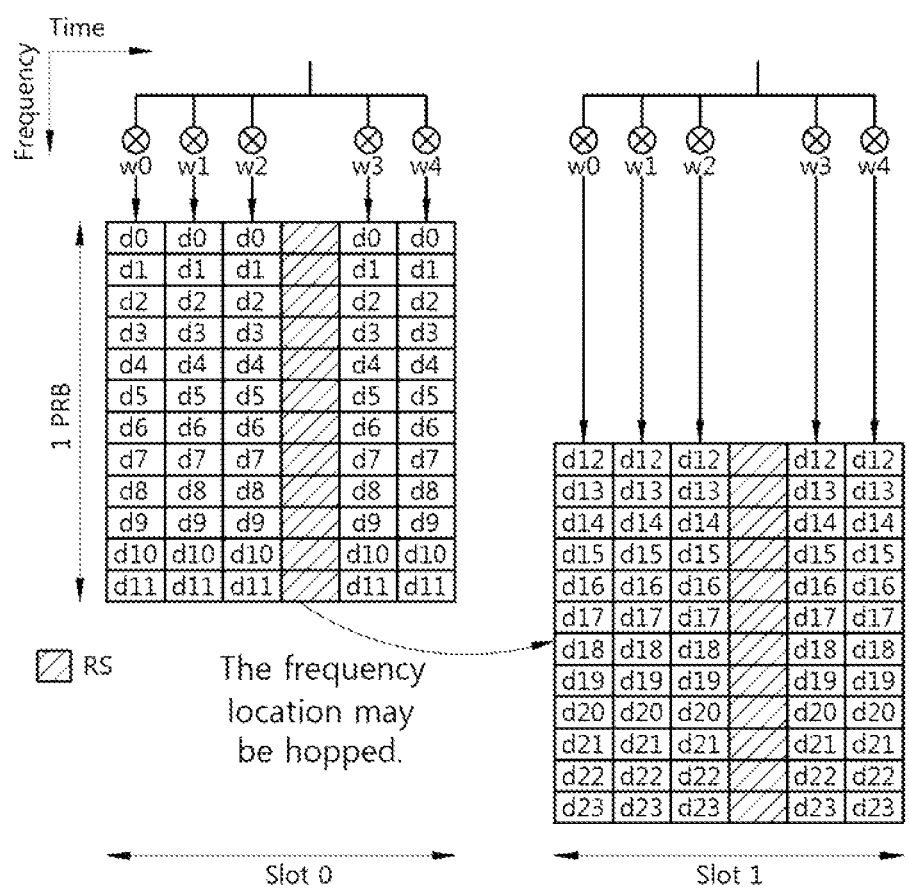
FIG. 22 is an example of time spreading for modulated QPSK symbols in the extended PUCCH format.

FIG. 22 is an example of time spreading for a modulated QPSK symbol with an extended PUCCH format. A case where a QPSK symbol is time-spread in an extended CP is shown in FIG. 22. Referring to FIG. 22, the QPSK symbol is time-spread across 5 SC-FDMA symbols in one slot. A reference signal is mapped to a $4^{th}$ SC-FDMA symbol in each slot. This is the same position to which a reference signal is mapped in PUCCH formats 2/2a/2b in LTE rel-8. When the QPSK symbol is time-spread, an orthogonal code having an index m which is predetermined or determined through dynamic signaling or RRC signaling can be used. If SF=5, the orthogonal code having the index m can be expressed by $w_m=[w_0\ w_1\ w_2\ w_3\ w_4]$. In addition, the orthogonal code can be hopped in a slot level.

Figure 23:
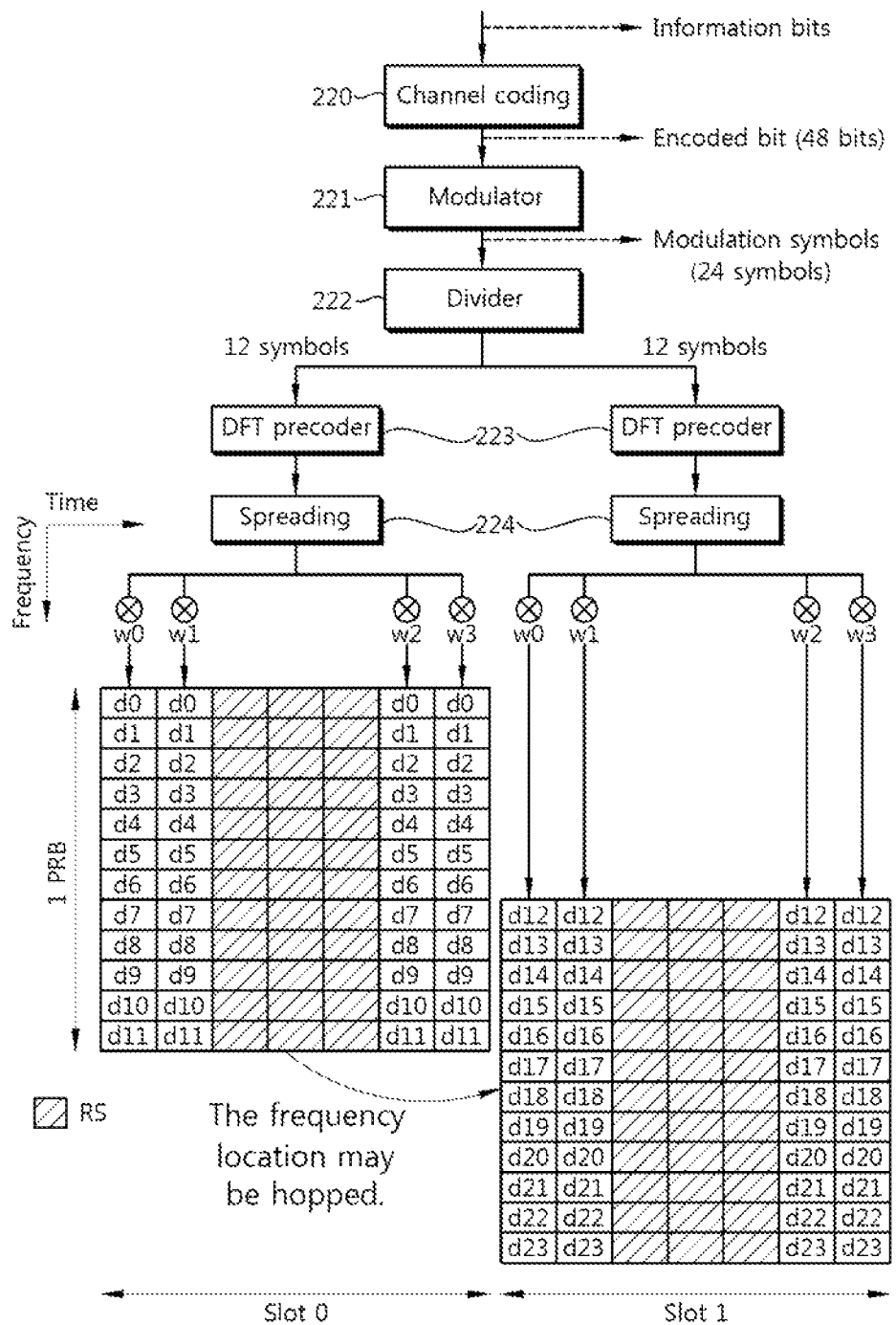
FIG. 23 is yet another example of the extended PUCCH format.

FIG. 23 is another example of the extended PUCCH format. The extended PUCCH format of FIG. 23 corresponds to the case where joint coding is performed on two slots within a subframe, and the multiplexing of a frequency division multiplexing (FDM) scheme is not used. Referring to FIG. 23, first, channel coding is performed on an information bit, such as ACK/NACK for each configuration carrier, (step S220). In the present embodiment, 48 encoding bits may be generated because the QPSK modulation scheme is applied and mapping is performed to two slots through 1 PRB including 12 subcarriers. The encoding information bits are modulated by a modulator (step S221). In the present embodiment, since the QPSK modulation scheme is applied, 24 QPSK symbols are generated. The QPSK symbols are spread into slots through a frequency divider (step S222). The QPSK symbols may be spread into two slots according to various methods. The order of the modulator and the frequency divider may be reversed. DFT precoding is performed on the QPSK symbols spread into each slot through the frequency divider (step S223). In the present embodiment, 12-point DFT precoding is performed because 12 QPSK symbols are spread into each slot. Time spreading is performed on the QPSK symbols on which DFT precoding has been performed in an SC-FDMA symbol level through an orthogonal code of an index m (step S104). The orthogonal code may be hopped in a slot level.

Figure 24:
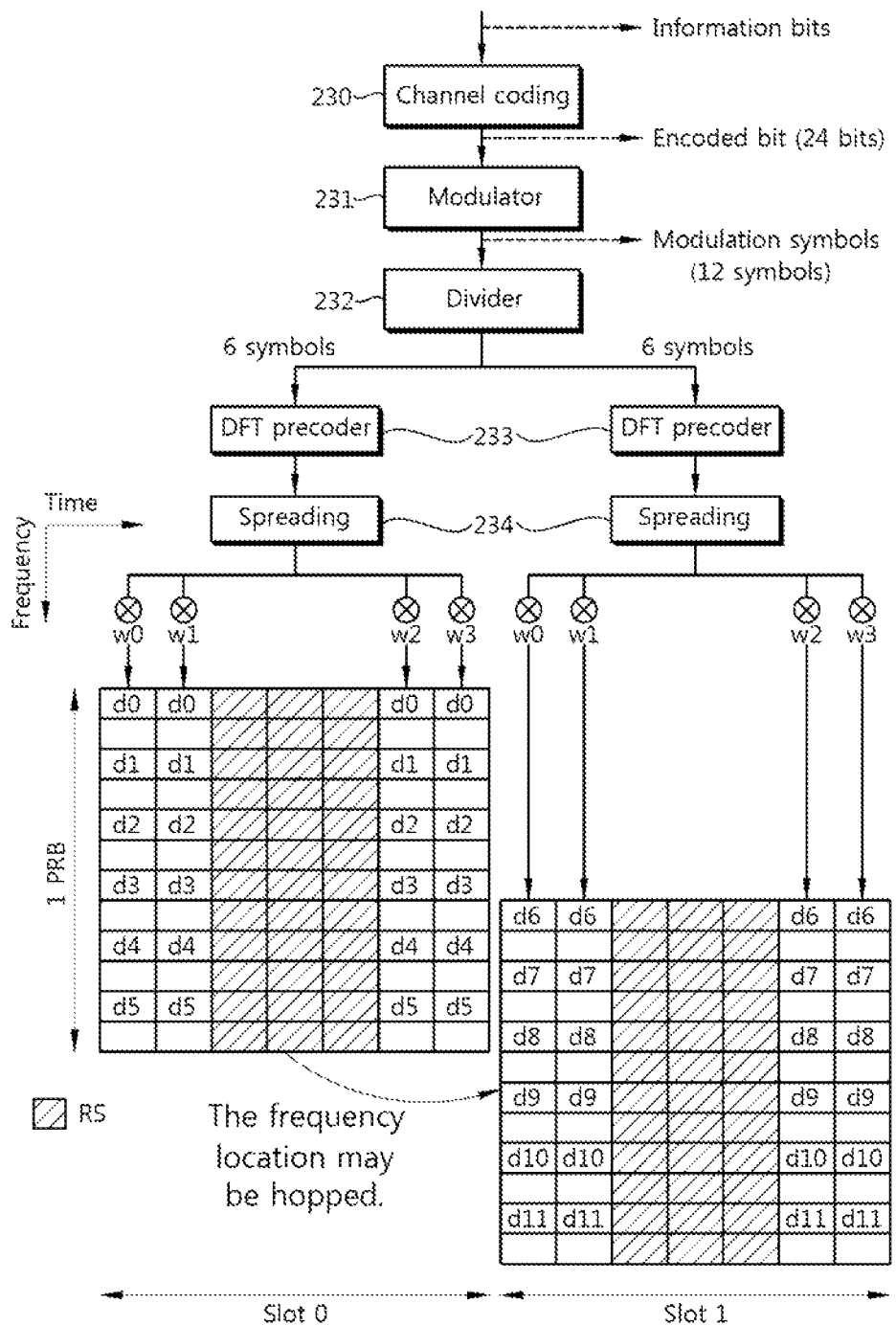
FIG. 24 is further yet another example of the extended PUCCH format.

FIG. 24 is another example of the extended PUCCH format. The extended PUCCH format of FIG. 24 shows the case where joint coding is performed on two slots within a subframe and the multiplexing of the FDM scheme is applied.

Referring to FIG. 24, first, channel coding is performed on an information bit, such as ACK/NACK for each configuration carrier, (step S230). In the present embodiment, 24 encoding bits may be generated because the QPSK modulation scheme is applied and mapping is performed to the two slots through 6 subcarriers within 1 PRB including 12 subcarriers. The encoding information bits are modulated through a modulator (step S231). In the present embodiment, 24 QPSK symbols are generated because the QPSK modulation scheme is applied. The QPSK symbols are spread into each slot through a frequency divider (step S232). The QPSK symbols may be spread into the two slots in various manners. The order of the modulator and the frequency divider may be reversed. DFT precoding is performed on the QPSK symbols spread into each slot through the frequency divider (step S233). In the present embodiment, 6-point DFT precoding is performed because 6 QPSK symbols are spread into each slot. Time spreading is performed on the QPSK symbols on which DFT precoding has been performed in an SC-FDMA symbol level through an orthogonal code of an index m (step S234). The orthogonal code may be hopped in a slot level.

The generated signal is mapped to subcarriers within the PRB. In FIG. 24, an SC-FDMA signal is mapped to subcarriers according to interleaving methods. That is, when the SC-FDMA signal is mapped to the subcarriers, it is mapped to the subcarriers at specific intervals. FIG. 24 illustrates that the SC-FDMA signal is mapped at 2 subcarrier intervals, but the SC-FDMA signal may be mapped at various intervals, such as 3/4/6 subcarriers.

Figure 25:
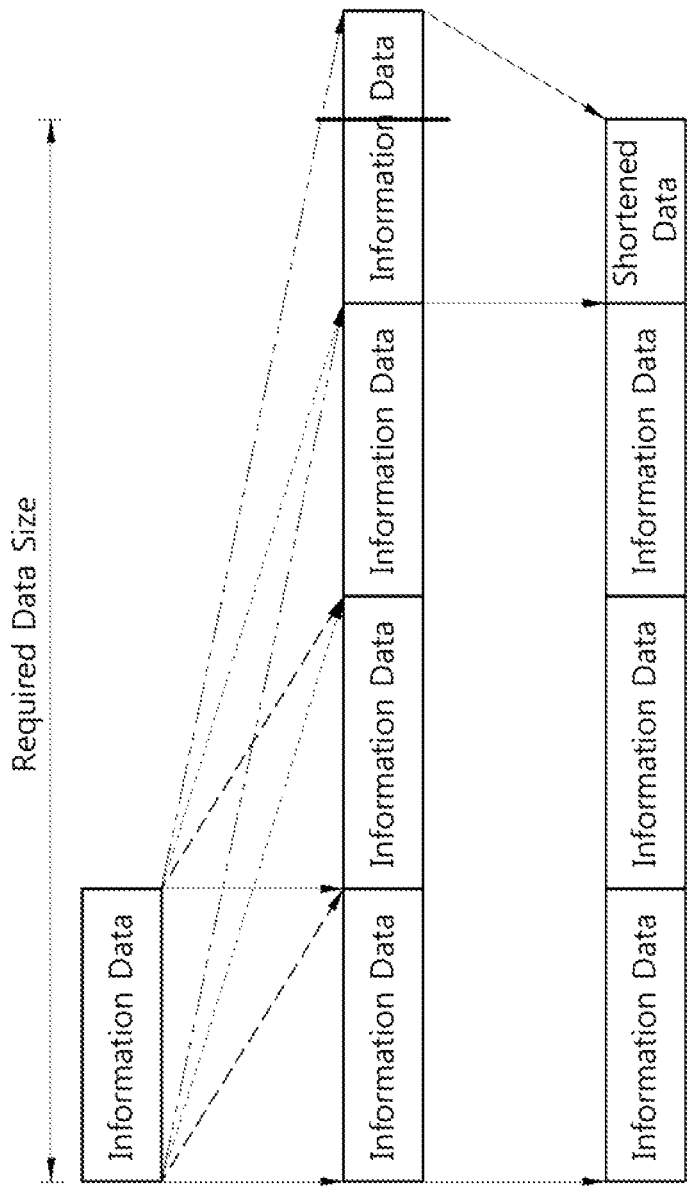
FIG. 25 shows a repetition coding method which may be used in channel coding.

FIG. 25 shows a repetition coding scheme which may be used in channel coding. Repetition coding means that given data is repeated several times based on the size of data necessary for a system. Repetition coding has poor performance than a common channel coding scheme, but it is very simple in the encoding and decoding process and easy to be embodied into hardware. Thus, repetition coding is widely used in a system that requires the size of data having a short length. Here, if the size of data necessary for a system is not a multiple of the size of the given data, some of data of the last repetition data block of encoded data may be omitted. Here, the data omitted in the last repetition data block may be the first or last part of the data or may be bits non-contiguous according to a specific rule.

Meanwhile, it is necessary to check whether the existing defined channel coding schemes are applied to the extended PUCCH format or not. For the channel coding schemes defined in LTE rel-8, reference may be made to Paragraph 5 of 3GPP TS 36.212 V8.8.0 (2009-12) "$3^{rd}$ Generation Partnership Project; Technical Specification Group Radio Access network; Evolved Universal Terrestrial Radio Access (E-UTRA); Multiplexing and channel coding (release 8)".

1) RM coding for a PUCCH: The RM coding for a PUCCH is defined as (20,A) for the encoding of CQI. Here, A is one of integers from 1 to 13, and it indicates the size of an information bit. Since the results 20 bits of channel coding are outputted without change, the RM coding cannot be applied to the extended PUCCH format without change.

2) RM coding for a PUSCH: The RM coding for a PUSCH is defined as (32,O) for the encoding of CQI. Here, O is one of integers from 1 to 11, and it indicates the size of an information bit. Since the results 32 bits of channel coding are outputted without change, the RM coding cannot be applied to the extended PUCCH format without change.

3) TBCC: TBCC may be used for the channel coding of a broadcasting channel (BCH), a DCI, and UCI of 11 bits or higher. TBCC can flexibly control the length of an information bit encoded through rate matching. It has been commonly known that TBCC has better performance than turbo coding in relation to an information bit of a small length. However, TBCC is disadvantageous in that it cannot be applied to information bits of less than 6 bits because it has a constraint length of 7.

4) Turbo coding: The turbo coding may be used for the channel coding of a PDSCH or PUSCH. Like TBCC, the turbo coding can flexibly control the length of an information bit encoded through rate matching. It has been commonly known that the turbo coding has poor performance than TBCC in relation to information bits of less than 100 bits. Furthermore, the turbo coding cannot be applied to the case where the length of an information bit is less than 3 because it is formed by concatenating 2 convolutional coding each having a constraint length of 3.

For this reason, the proposed invention proposes a channel coding scheme applicable to the extended PUCCH format. The present invention can flexibly control the length of an encoded information bit because it is used along with convolutional coding, TBCC, or turbo coding. In general, the coding scheme, such as convolutional coding, TBCC, or turbo coding, is applicable to an information bit having a constraint length or higher, and thus the present invention proposes a method of performing channel coding on an information bit having the constraint length or less. According to the proposed invention, uplink control information can be efficiently transmitted.

Hereinafter, TBCC is chiefly described below. The channel coding of the TBCC scheme can be applied to an information bit stream having a length of K−1 or higher when a constraint length is K. This is because when an encoded information bit stream is decoded, the first K−1 bits of information bits are used as the initial value of a register. The TBCC defined in LTE rel-8 can be applied to an information bit stream of 6 bits or higher because it has a constraint length of 7. The present invention provides a method of performing channel coding on an information bit stream when the length of an information bit is smaller than K−1 and transmitting the information bit stream. A bit stream generated by performing channel coding on an information bit stream is hereinafter called an encoding information bit stream.

Figure 26:
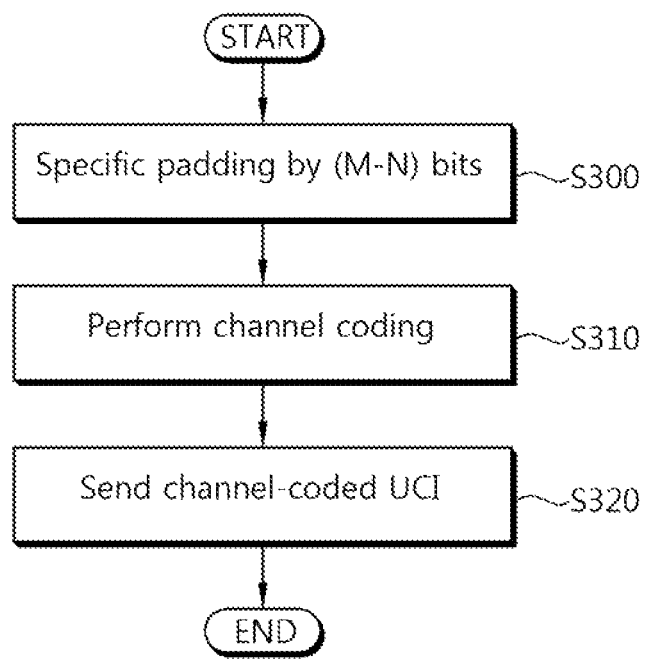
FIG. 26 is an embodiment of a proposed method of transmitting uplink control information.

FIG. 26 is an embodiment of a proposed method of transmitting uplink control information.

At step S300, UE pads (M-N) bits to an information bit stream randomly. N is the length of an information bit.

M is a specific value determined from a constraint length. M may be determined in various manners. For example, M may be equal to K. Or, M may be the smallest integer, from among integers each greater than K (M=K+1). Or, M may be the greatest integer, from among integers each smaller than K (M=K−1). Or, M may be the greatest integer, from among integers each smaller than K−1 (M=K−2). Or, M may be the least value of the size of an information bit that may be supported. It is hereinafter assumed that M=K−1.

The padded (M-N) bits may also be determined in various manners. For example, the padded (M-N) bits may be a 0 bit stream formed of 0s. In this case, a receiving terminal may check whether the values of a relevant 0 bit stream are all 0 and check whether N information bit streams have been received without error or not. That is, the 0 bit stream may be used for a virtual CRC.

Or, the padded (M-N) bits may be a CRC value obtained by CRC-encoding N information bit streams.

Or, the padded (M-N) bits may be a predetermined pattern. The predetermined pattern may be a pattern in previously randomized in order to improve the performance of channel coding. For example, the padded (M-N) bits may be [1 0 1 0 . . . ], that is, a form in which 1 and 0 are alternately placed. Or, the padded (M-N) bits may be a complementary form of an information bit stream. That is, when the information bit stream is [1 0 0], the padded (M-N) bits may be [0 1 1]. Or, another channel coding scheme in which the length of an encoding information bit stream is M may be applied. Here, the channel coding scheme may be, in particular, a block code, such as an RM code or a Golay-based code. Since the channel coding scheme has only to be supplied for an information bit stream having a short length that cannot support TBCC, decoding can be performed using a code table instead of a decoder.

Or, the padded (M-N) bits may be the simple repetition of an information bit stream. For example, if an information bit stream must be [0 1 0] and an encoding information bit stream must be 6 bits, the encoding information bit stream may be the simple repetition [0 1 0 0 1 0] of the information bit stream.

Referring back to FIG. 26, at step S310, the UE generates an encoding information bit stream by performing channel coding on the information bit stream on which the (M-N) bits has been padded. At step S320, the UE transmits the encoding information bit stream.

Figure 27:
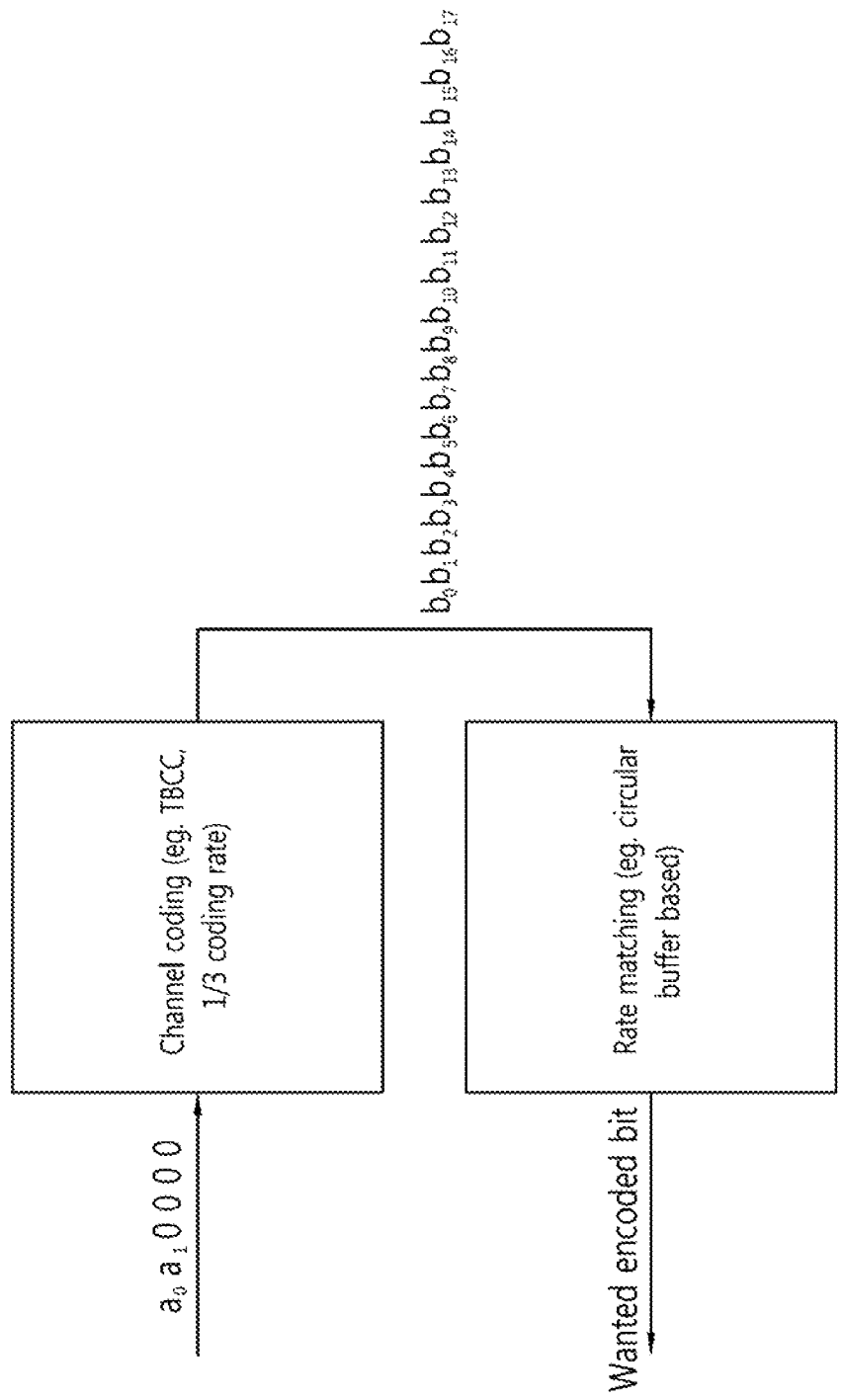
FIG. 27 is an embodiment of channel coding according to the proposed method of transmitting uplink control information.

FIG. 27 is an embodiment of channel coding according to the proposed method of transmitting uplink control information.

The proposed method of transmitting uplink control information shown in FIG. 26 is described by taking TBCC having a constraint length K=7. In the case of TBCC, channel coding is possible for only an information bit stream of 6 bits or higher because K=7. In the present embodiment, an information bit stream is assumed to have 2 bits. If M=K−1=6 is assumed, 4(6−2) bits are padded to a 0 bit stream.

Assuming that the information bit stream of 2 bits is [$a_0$ $a_1$], [$a_0$ $a_1$ 0 0 0 0] of 6 bits to which the 0 bit stream of 4 bits has been padded become the input of TBCC. Here, a sub-block interleaver may be included in a channel coding terminal or a rate matching terminal. TBCC is performed on the information bit stream of 6 bits at a coding rate of 1/3, thereby generating [$b_0$ $b_1$ $b_2$ $b_3$ $b_4$ $b_5$ $b_6$ $b_7$ $b_8$ $b_9$ $b_{10}$ $b_{11}$ $b_{12}$ $b_{13}$ $b_{14}$ $b_{15}$ $b_{16}$ $b_{17}$], that is, an encoding information bit stream of 18 bits. Bits having a desired length are generated through rate matching. Here, the length of the bit stream generated through rate matching may be 48 bits suitable for the extended PUCCH format. The rate matching may be performed based on a circular buffer. The encoding information bit stream is modulated after the rate matching, spread into an SC-FDMA symbol, converted into a physical signal, and then transmitted through an RF unit.

Decoding may be performed in the order opposite to the order of the channel coding of FIG. 27 in a receiving terminal, and $[a_0' a_1' a_2' a_3' a_4' a_5']$ can be finally obtained. Here, $[a_0' a_1']$ is an information bit stream, and $[a_2' a_3' a_4' a_5']$ is a 0 bit stream already known to the receiving terminal Thus, decoding may be performed on $[a_0' a_1']$. $[a_2' a_3' a_4' a_5']$ is a value already known to the transmitting terminal and the receiving terminal and may be used to check whether information bits have been precisely decoded or not in the receiving terminal. That is, $[a_2' a_3' a_4' a_5']$ may be used for a virtual CRC.

TBCC has been chiefly described, but the present invention may also be applied to turbo coding. In turbo coding, channel coding is performed by concatenating two convolutional codes each having K=3. When an information bit is 1 bit, 2 bits may be padded and turbo coding may be performed according to the present invention.

Figure 28:
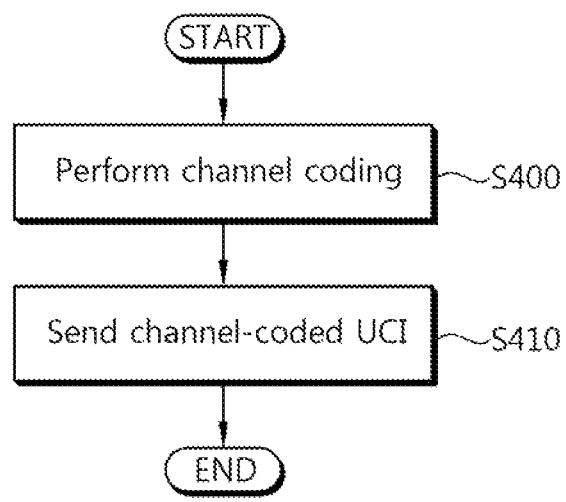
FIG. 28 is another embodiment of the proposed method of transmitting uplink control information.

FIG. 28 is another embodiment of the proposed method of transmitting uplink control information.

At step S400, UE generates an encoding information bit stream by performing channel coding on an information bit stream according to the length of the information bit stream based on M.

M is a specific value determined from a constraint length. M may be determined in various manners. For example, M may be equal to K. Or, M may be the smallest integer, from among integers each greater than K (M=K+1). Or, M may be the greatest integer, from among integers each smaller than K (M=K−1). Or, M may be the greatest integer, from among integers each smaller than K−1 (M=K−2). Or, M may be the least value of the size of an information bit that may be supported. It is hereinafter assumed that M=K−1.

TBCC or turbo coding may be performed on an information bit stream having a length of M or higher.

Various channel coding schemes described later may be applied to an information bit stream having a length of less than M.

1) Block coding, such as RM coding, punctured RM coding, or TCIF coding, may be performed on an information bit stream having a length of less than M.

2) Channel coding that has a different scheme different channel coding applied to an information bit stream having a length of M or higher may be performed on an information bit stream having a length of less than M. For example, if TBCC is performed on the information bit stream having the length of M or higher, punctured RM coding may be performed on the information bit stream having the length of less than M. Or, if channel coding schemes have different polynomials although they have the same type, channel coding of different schemes may be applied. For example, assuming that TBCC of 133, 171,165 (Octal) is applied to the information bit stream having the length of M or higher, TBCC of $a_0 a_1 a_2$, $b_0 b_1 b_2$, $c_0 c_1 c_2$ (Octal) may be performed on the information bit stream having the length of less than M.

3) Repetition coding may be performed on the information bit stream having the length of less than M. For example, when an information bit stream is $[a_0]$ and a coding rate is 1/3, $[a_0 a_0 a_0]$ may be generated into an encoding information bit stream according to the repetition coding. Furthermore, when an information bit stream is $[a_0 a_1]$ and a coding rate is 1/3, $[a_0 a_0 a_0 a_1 a_1 a_1]$ may be generated into an encoding information bit stream according to the repetition coding or $[a_0 a_1 a_0 a_1 a_0 a_1]$ may be generated into an encoding information bit stream by applying interleaving to the repetition coding.

Here, the rate matching may be performed as follows. That is, when the length of an information bit stream is N and the length of an encoding information bit stream generated as a result of the repetition coding is $N_{encoded}$, the repetition coding may be performed $$\left\lceil \frac{N_{encoded}}{N} \right\rceil$$

times and the rate matching may be then performed. For example, when N=5 and $N_{encoded}$=48, the repetition coding may be performed $$\left\lceil \frac{48}{5} \right\rceil = 10$$

times and rate matching is performed on an encoding information bit stream of 50 bits as 48 bits. In the rate matching, two specific bit elements may be omitted in the encoding information bit stream $[b_0 b_1 \ldots b_{49}]$. Or, $[b_0 b_1 \ldots b_{47}]$ or $[b_2 b_3 \ldots b_{49}]$ may be used as the encoding information bit stream. Or, $[b_{47} b_{46} \ldots b_0]$ or $[b_{49} b_{48} \ldots b_2]$ may be used in the order opposite to the order of the encoding information bit stream.

Or, rate matching may be performed on an encoding information bit stream subjected to repetition coding by using a circular buffer. Here, the repetition coding is performed at a coding rate of 1/3, and interleaving may be applied to the repetition coding. For example, if an information bit stream is $[a_0 a_1]$, when the repetition coding is performed by applying interleaving at a coding rate of 1/3, $[a_0 a_1 a_0 a_1 a_0 a_1]$ is generated. The rate matching may be performed on $[a_0 a_1 a_0 a_1 a_0 a_1]$ by the desired length of an encoding information bit stream. Assuming that the rate matching is performed in an encoding information bit stream of 48 bits, the $[a_0 a_1 a_0 a_1 a_0 a_1]$ is subject to the rate matching while it is sequentially circulated from a bit element in the former part until it becomes 48 bits. In this example, a bit stream of 6 bits is repeated 8 times, thereby generating an encoding information bit stream of 48 bits.

Or, an encoding information bit stream may be generated by sequentially circulating and reading an information bit stream until the encoding information bit stream has a desired length. For example, when an information bit stream is $[a_0 a_1 a_2 a_3 a_4]$, an encoding information bit stream $[a_0 a_1 a_2 a_3 a_4 a_0 a_1 a_2 a_3 a_4 \ldots a_0 a_1 a_2]$ may be generated by reading the information bit stream until 48 bits are satisfied.

4) The repetition coding may be performed on the information bit stream having the length of less than M, but precoding for adding a parity bit to the information bit stream may be first performed and the repetition coding may be then performed on the information bit stream to which the parity bit has been added.

Figure 29:
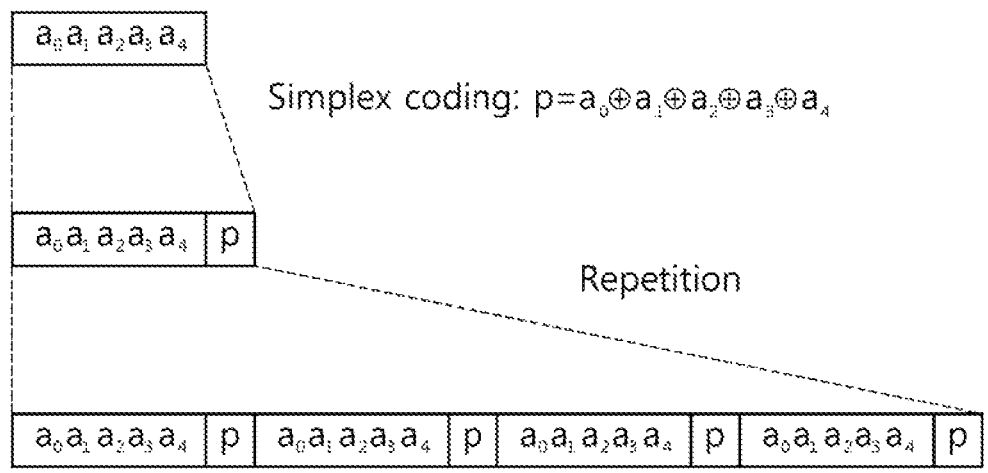
FIG. 29 is an embodiment of channel coding according to the proposed method of transmitting uplink control information.

FIG. 29 is an embodiment of channel coding according to the proposed method of transmitting uplink control information. If the length of an information bit stream N is not a divisor of the desired length $N_{encoded}$ of an encoding information bit stream, precoding for generating a parity bit by a minimum of a bits that makes N+a a divisor of $N_{encoded}$ may be performed, and $N_{encoded}/(N+a)$ times repetition coding may be then performed on the information bit stream of the length N and the parity bit of the a bits. For example, when the length of an information bit stream is 5 bits and the desired length of an encoding information bit stream is 24 bits, a minimum a that makes 5+a(N+a) a divisor of 24($N_{encoded}$) is 1, and thus a parity bit p of 1 bit is generated. The parity bit of 1 bit may be generated in various manners. For example, the parity bit p of 1 bit may be generated by performing simplex coding for performing an XOR operation on all the elements of an information bit stream. A method of generating the parity bit is not limited thereto. An encoding information bit stream of 24 bits may be generated by repeating a bit stream having a length 6 in which an information bit stream [$a_0\ a_1\ a_2\ a_3\ a_4$] of 5 bits and the parity bit p of 1 bit are summed 4 times.

Or, the length of the parity bit may be previously determined. When the length of an information bit stream is N, the length of an information bit stream to which a parity bit has been added by precoding is $N_{pre}$, and the desired length of an encoding information bit stream is $N_{encoded}$, repetition coding may be performed $$\left\lceil \frac{N_{encoded}}{N_{pre}} \right\rceil$$

times and rate matching may be performed. The parity bit may be generated in various manners. For example, when N=4, $N_{pre}$=5, and $N_{encoded}$=48, repetition coding is performed $$\left\lceil \frac{48}{5} \right\rceil = 10$$

times and rate matching is performed on an encoding information bit stream of 50 bits in 48 bits. In this rate matching, two specific bit elements may be omitted in the encoding information bit stream [$b_0\ b_1\ \ldots\ b_{49}$]. Or, [$b_0\ b_1\ \ldots\ b_{47}$] or [$b_2\ b_3\ \ldots\ b_{49}$] may be used as the encoding information bit stream. Or, [$b_{47}\ b_{46}\ \ldots\ b_0$] or [$b_{49}\ b_{48}\ \ldots\ b_2$] may be used in the order opposite to the order of the encoding information bit stream.

5) The repetition coding is performed on an information bit stream having the length of less than M, but precoding for generating a bit stream corresponding to half the desired length of the information bit stream may be first performed and repetition coding for repeating the generated bit stream twice may be then performed.

Figure 30:
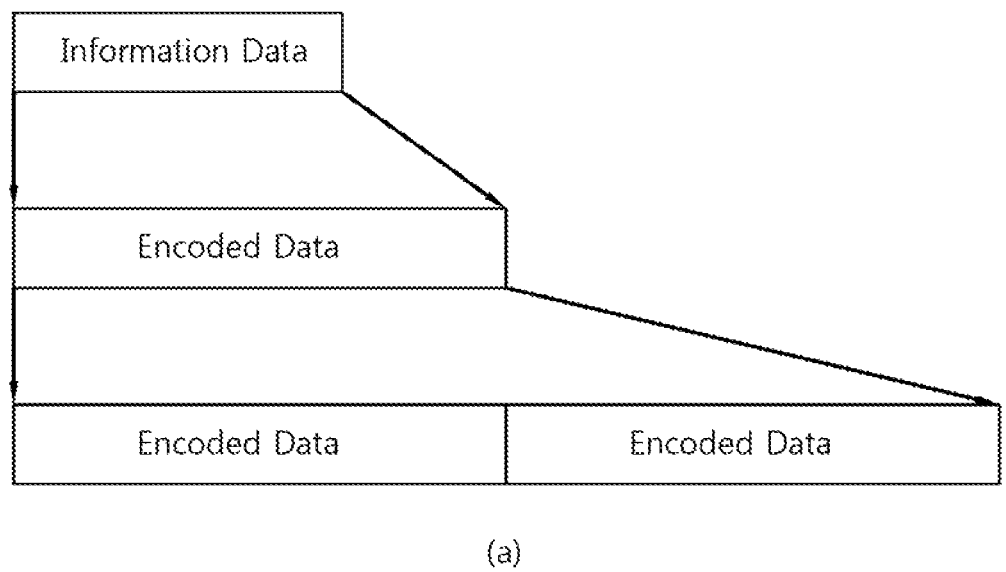
FIG. 30 is an embodiment of channel coding according to the proposed method of transmitting uplink control information.
Figure 30:
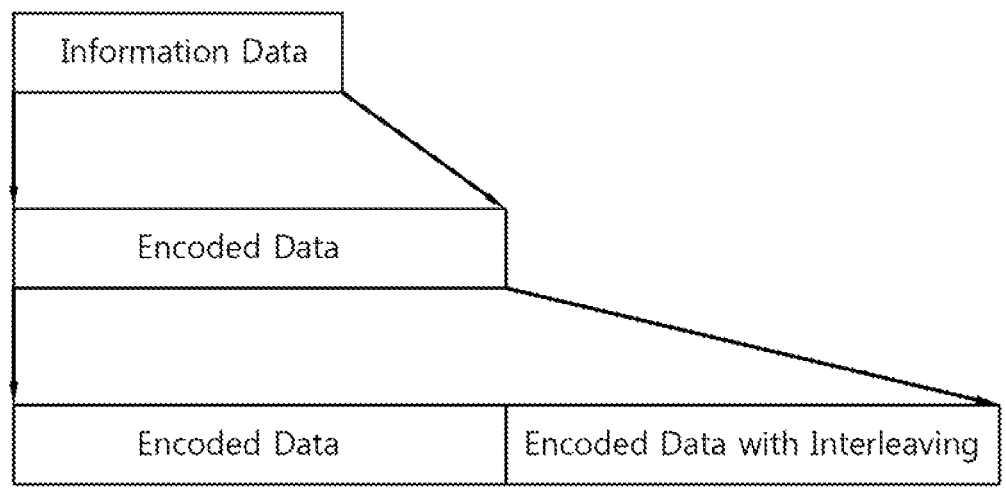

FIG. 30 is an embodiment of channel coding according to the proposed method of transmitting uplink control information. When the length of an information bit stream is N, the desired length of an encoding information bit stream is $N_{encoded}$, a precoding information bit stream is generated by precoding the information bit stream using $N_{encoded}/2$ bits and an encoding information bit stream of $N_{encoded}$ bits is generated by repeating the precoding information bit stream twice. For example, when $N_{encoded}$=48, a precoding information bit stream of 48/2=24 may be generated by performing precoding on an information bit stream, and an encoding information bit stream having a length 48 may be generated by repeating the precoding information bit stream of 48/2=24. Here, the precoding information bit stream may be repeated by using interleaving. The precoding information bit stream to which interleaving has been applied may be a change of the order of bit elements within the precoding information bit stream. FIG. 29-(b) is an example of the case where an encoding information bit stream is generated by repeating a precoding information bit stream using interleaving. The precoding information bit stream to which interleaving has been applied may be placed in either a first block or a second block.

Referring back to FIG. 28, at step S410, the UE transmits the generated encoding information bit stream.

Meanwhile, conventional repetition coding has a very small minimum distance between the codewords of encoded data. For example, when the length of an information bit stream is N and the desired length of an encoding information bit stream is $N_{encoded}$, if the encoding information bit stream is generated by performing repetition coding, a minimum distance $d_{min}$ between the codeword of encoded data may be given by Equation 5.

$$d_{min} = \left\lfloor \frac{N_{encoded}}{N} \right\rfloor \qquad <\text{Equation 5}>$$

This is a very small value as compared with the length of all the encoded data, and the performance of repetition coding is poorer than those of other channel coding schemes.

Accordingly, a new repetition coding scheme having improved channel coding performance in association with modulation may be proposed. The proposed repetition coding scheme has the same complexity as the existing repetition coding scheme, but has an increased minimum distance between codewords, thus being capable of improving channel coding performance.

Figure 31:
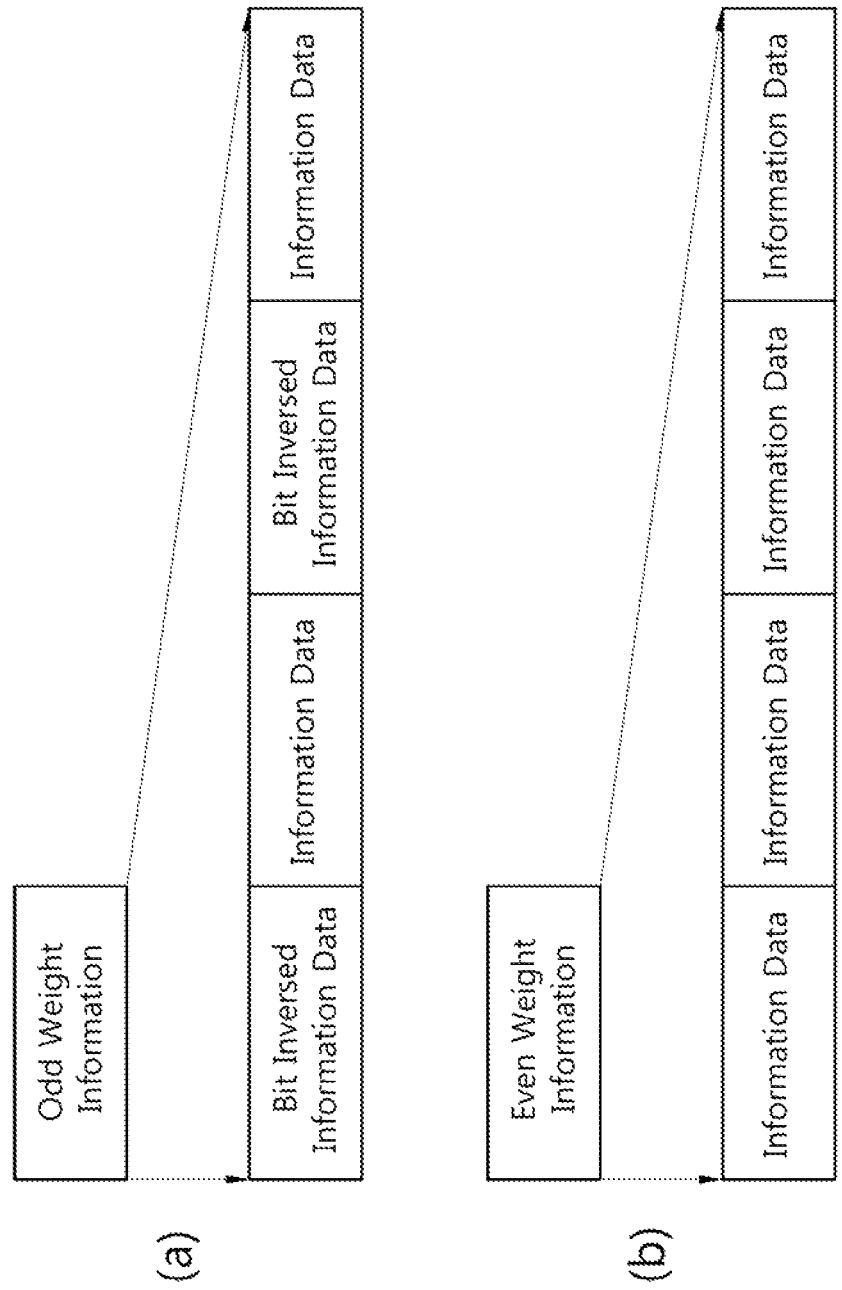
FIG. 31 is an example of an improved repetition coding method.

FIG. 31 is an example of an improved repetition coding method.

The improved repetition coding scheme determines an odd-numbered repetition block in an encoding information bit stream based on the number of is of a given information bit stream. More particularly, the number of is checked in the information bit stream. If the number of is an odd number, the odd-numbered repetition block is inversely subject to bit inversion of each bit element of the given information bit stream and repeated at the time of repetition coding. The even-numbered repetition block repeats the given information bit stream without change. When the number of is an even number, the odd-numbered repetition block repeats the given information bit stream like the even-numbered repetition block. To inversely performing bit inversion on each bit element may be represented by an XOR operation or a modular operation of $(b_0+1) \mod 2$. For example, if data is $d_0$=1100 and $d_1$=1110 and the length of an encoding information bit stream $N_{encoded}$=8, when the improved repetition coding scheme is applied, the data is encoded into $c_0$=11001100 and $c_1$=00011110 as a result of repetition coding. The number of is in $d_0$=1100 is 2, and thus the first repetition block and the second repetition block of an encoding information bit stream have a form in which repeats $d_0$ without change. The number of is in $d_1$=1110 is 3, and thus a first repetition block, that is, the odd-numbered repetition block of the encoding information bit stream is inversely subject to bit inversion of $d_1$=1110, which becomes 0001, and a second repetition block, that is, the even-numbered repetition block of the encoding information bit stream repeats $d_1$=1110 without change. Accordingly, a minimum distance between codewords becomes 4, and thus the minimum distance between codewords becomes twice as compared with the existing repetition coding scheme.

The minimum distance between codewords according to the improved repetition coding scheme may be determined according to Equation 6.

$$d_{min} = \min\left(2 \times \left\lfloor \frac{N_{encoded}}{N} \right\rfloor, \quad N \times \left\lfloor \frac{N_{encoded}}{2N} \right\rfloor + \left\lfloor \frac{\mod(N_{encoded}, 2N)}{N} \right\rfloor\right)$$ <Equation 6>

That is, in a process of performing the repetition coding scheme, the performance of repetition coding can be improved while maintaining complexity at the time of encoding and decoding without change by performing simple modulation.

Meanwhile, the improved repetition coding scheme is not limited to the above embodiments, but may be applied to the case where the number of 1s in a given information bit stream is an even number not an odd number. Furthermore, the repetition block subject to the inversion of each bit element and then repeated may be an even-numbered repetition block not an odd-numbered repetition block. Furthermore, interleaving in which the position is changed for each repetition block after the improved repetition coding scheme is applied may be applied, and interleaving in which the position of information bits is changed within the repetition block may be applied.

A method of transmitting uplink control information to which the above-described improved repetition coding scheme has been applied may be proposed. The present invention can flexibly control the length of an encoded information bit when it is combined with convolutional coding, TBCC, or turbo coding. In general, a coding method, such as convolutional coding, TBCC, or turbo coding can be applied to an information bit having a constraint length or higher, and thus the present invention proposes a method of performing channel coding on an information bit having a constraint length or less. Uplink control information can be efficiently transmitted according to the proposed invention.

Hereinafter, TBCC is chiefly described below. Channel coding using the TBCC scheme can be applied to an information bit stream having a length of K−1 or higher when a constraint length is K. TBCC defined in LTE rel-8 as a constraint length of 7, and it can be applied to an information bit stream of 6 bits or higher. The present invention provides a method of performing channel coding on an information bit stream when the length of an information bit is smaller than K−1 and transmitting the information bit stream.

Figure 32:
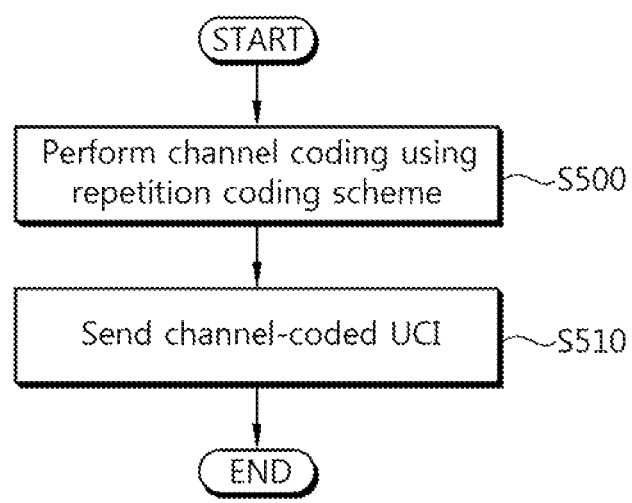
FIG. 32 is yet another embodiment of the proposed method of transmitting uplink control information.

FIG. 32 is another embodiment of the proposed method of transmitting uplink control information.

At step S500, UE generates an encoding information bit stream by performing channel coding to which the repetition coding scheme has been applied on uplink control information.

First, a reference value M may be determined from the length of a given information bit stream and a constraint length K. M may be determined in various manners. For example, M may be equal to K. Or, M may be the smallest integer, from among integers each greater than K (M=K+1). Or, M may be the greatest integer, from among integers each smaller than K (M=K−1). Or, M may be the greatest integer, from among integers each smaller than K−1 (M=K−2). Or, M may be the least value of the size of an information bit that may be supported. M may be greater or smaller than K depending on systems. It is hereinafter assumed that M=K−1.

TBCC may be performed on an information bit stream having a length of M or higher.

The improved repetition coding scheme may be performed on an information bit stream having a length of less than M.

If the number of is in the information bit stream is an odd number, an odd-numbered repetition block, from among repetition blocks, is subject to the inversion of the information bit stream and repeated. For example, when K=7, M=6 is set. When N=4 and $N_{encoded}$=24, N=4<M=6. Thus, the improved repetition coding scheme may be applied. Assuming that the information bit stream is [$a_0$ $a_1$ $a_2$ $a_3$] and the number of is in the information bit stream is an odd number, an encoding information bit stream may be determined by Equation 7.

$$\overline{a_0 a_1 a_2 a_3} a_0 a_1 a_2 a_3 \overline{a_0 a_1 a_2 a_3} a_0 a_1 a_2 a_3 \overline{a_0 a_1 a_2 a_3} a_0 a_1 a_2 a_3$$ <Equation 7>

The encoding information bit stream of Equation 7 may be interleaved for each repetition block or bit.

If the number of is in the information bit stream is an even number, the encoding information bit stream may be determined by Equation 8.

$$a_0 a_1 a_2 a_3 a_0 a_1 a_2 a_3 a_0 a_1 a_2 a_3 a_0 a_1 a_2 a_3 a_0 a_1 a_2 a_3 a_0 a_1 a_2 a_3$$ <Equation 8>

That is, the information bit stream is repeated 6 times without change. The encoding information bit stream of Equation 8 may be interleaved for each repetition block or bit.

Furthermore, when $N_{encoded}$=48, if the number of is in the information bit stream is an odd number, the encoding information bit stream may be determined by Equation 9.

$$\overline{a_0 a_1 a_2 a_3} a_0 a_1 a_2 a_3 \overline{a_0 a_1 a_2 a_3} a_0 a_1 a_2 a_3 \overline{a_0 a_1 a_2 a_3} a_0 a_1 a_2 a_3$$
$$\overline{a_0 a_1 a_2 a_3} a_0 a_1 a_2 a_3 \overline{a_0 a_1 a_2 a_3} a_0 a_1 a_2 a_3 \overline{a_0 a_1 a_2 a_3} a_0 a_1 a_2 a_3$$ <Equation 9>

The encoding information bit stream of Equation 9 may be interleaved for each repetition block or bit.

If the number of is in the information bit stream is an even number, an encoding information bit stream may be determined by Equation 10.

$$a_0 a_1 a_2 a_3 a_0 a_1 a_2 a_3 a_0 a_1 a_2 a_3 a_0 a_1 a_2 a_3 a_0 a_1 a_2 a_3 a_0 a_1 a_2 a_3$$
$$a_0 a_1 a_2 a_3 a_0 a_1 a_2 a_3 a_0 a_1 a_2 a_3 a_0 a_1 a_2 a_3 a_0 a_1 a_2 a_3 a_0 a_1 a_2 a_3$$ <Equation 10>

That is, the information bit stream is repeated 12 times without change. The encoding information bit stream of Equation 10 may be interleaved for each repetition block or bit.

Furthermore, if the number of is in the information bit stream is not an odd number, but an even number, an odd-numbered repetition block, from among repetition blocks, may be subject to a bit inverse operation and then repeated. Or, a repetition block subjected to the inversion of each bit element and repeated may be an even-numbered repetition block not an odd-numbered repetition block, and the bit inverse operation may be performed on repetition blocks half all the encoding information bit streams not the odd-numbered repetition block or the even-numbered repetition block. Furthermore, block interleaving in which the position of a repetition block is changed for each repetition block may be applied, and bit interleaving in which the position of an information bit is changed within a repetition block may be applied.

Meanwhile, the last repetition block may be set differently from other repetition blocks depending on the length N of the information bit stream and the length $N_{encoded}$ of the encoding information bit stream. N and $N_{encoded}$ may have a relationship of Equation 11.

$$2kN < N < (2k+1)N$$ <Equation 11>

In Equation 11, k is an integer. If N and $N_{encoded}$ satisfy Equation 11, for example, when N=5 and $N_{encoded}$=24, the last repetition block may be a bit stream obtained by puncturing some of given information bit streams based on the length of all the encoding information bit streams. Or, the last repetition block may be a bit stream obtained by performing a bit inverse operation on given information bit streams and puncturing some of the given information bit streams based on the length of all the encoding information bit streams. Here, some of the punctured bit streams may be the first or last part of the bit streams or some of the bit streams may be punctured by a contiguously or non-contiguously necessary length from a specific position of the bit stream.

Or, N and $N_{encoded}$ may have a relationship of Equation 12.

$$(2k+1)N < N < (2k+2)N \qquad \text{<Equation 12>}$$

In Equation 12, k is an integer. If N and $N_{encoded}$ satisfy Equation 12, for example, if N=5 and $N_{encoded}$=48, a $(2k+1)^{th}$ repetition block may be a bit stream according to the simple repetition of an information bit stream, and a $(2k+2)^{th}$ repetition block may be a bit stream obtained by performing a bit inverse operation on given information bit streams and puncturing some of the given information bit streams based on the length of all the encoding information bit streams. Or, the $(2k+1)^{th}$ repetition block may be a bit stream obtained by performing a bit inverse operation on an information bit stream, and the $(2k+2)^{th}$ repetition block may be a bit stream obtained by puncturing some of given information bit streams based on the length of all the encoding information bit streams. If a difference between the number of repetition blocks on which the bit inverse operation has been performed until the $(2k+2)^{th}$ repetition block and the number of repetition blocks on which the bit inverse operation has not been performed is or higher, a bit inverse operation may be performed on both the $(2k+1)^{th}$ repetition block and the $(2k+2)^{th}$ repetition block. Here, the last repetition block may be a bit stream obtained by puncturing some of bit streams based on the length of all the encoding information bit streams. Here, some of the punctured bit streams may be the first or last part of the bit streams or some of the bit streams may be punctured by a contiguously or non-contiguously necessary length from a specific position of the bit stream.

Referring back to FIG. 32, at step S510, the UE transmits the encoding information bit stream.

The performance of a minimum distance between codewords is improved according to the improved repetition coding scheme applied to the method of transmitting uplink control information of FIG. 32. Table 13 minimum distance performance according to the length of an information bit stream when the length of an encoding information bit stream is 24.

TABLE 13

|  | Information size | | | | |
| --- | --- | --- | --- | --- | --- |
|  | 1 | 2 | 3 | 4 | 5 |
| Minimum distance | 12 | 12 | 12 | 12 | 8 |

Table 14 minimum distance performance according to the length of an information bit stream when the length of an encoding information bit stream is 48.

TABLE 14

|  | Information size | | | | |
| --- | --- | --- | --- | --- | --- |
|  | 1 | 2 | 3 | 4 | 5 |
| Minimum distance | 24 | 24 | 24 | 24 | 18 |

Furthermore, two or more channel coding schemes may be combined according to the length of an information bit stream. For example, if the length of an information bit stream is 1, the existing simple repetition coding scheme may be applied. If the length of an information bit stream is 2 or more, the improved repetition coding scheme may be applied. Table 15 minimum distance performance according to the length of an information bit stream when the length of an encoding information bit stream is 24 when the combined channel coding scheme is applied as described above.

TABLE 15

|  | Information size | | | | |
| --- | --- | --- | --- | --- | --- |
|  | 1 | 2 | 3 | 4 | 5 |
| Minimum distance | 24 | 12 | 12 | 12 | 8 |

Table 16 minimum distance performance according to the length of an information bit stream when the length of an encoding information bit stream is 48 if the combined channel coding scheme is applied.

TABLE 16

|  | Information size | | | | |
| --- | --- | --- | --- | --- | --- |
|  | 1 | 2 | 3 | 4 | 5 |
| Minimum distance | 48 | 24 | 24 | 24 | 18 |

Furthermore, three or more channel coding schemes not the two or more channel coding methods may be combined and applied.

Figure 33:
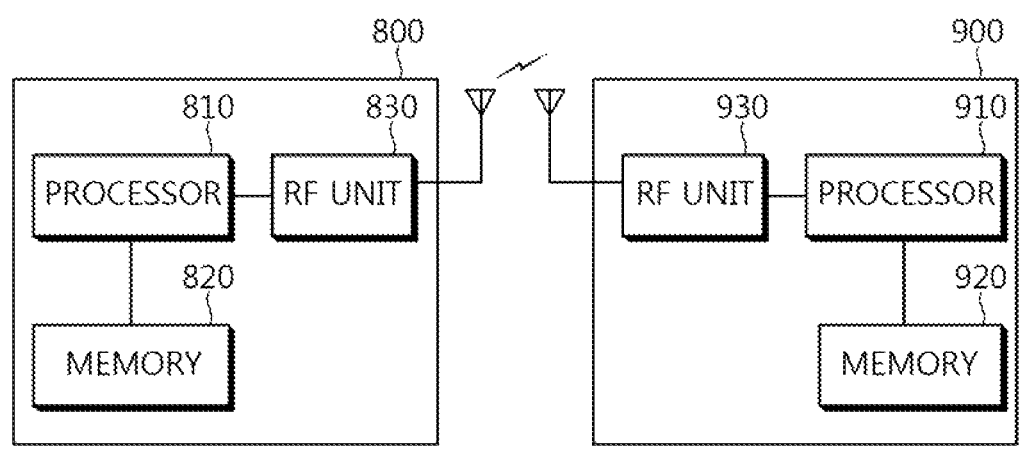
FIG. 33 is a block diagram of a BS and UE in which the embodiments of the present invention are embodied.

FIG. 33 is a block diagram of a BS and UE in which the embodiments of the present invention are embodied.

The BS 800 includes a processor 810, memory 820, and a radio frequency (RF) unit 830. The processor 810 embodies the proposed functions, processes and/or methods. The layers of a radio interface protocol may be embodied by the processor 810. The memory 820 is connected to the processor 810, and it stores various pieces of information for driving the processor 810. The RF unit 830 is connected to the processor 810, and it transmits and/or receives radio signals.

The UE 900 includes a processor 910, memory 920, and an RF unit 930. The processor 910 embodies the proposed functions, processes and/or methods. The layers of a radio interface protocol may be embodied by the processor 910. The processor 910 generates an encoding information bit stream by performing channel coding on a UCI bit stream, generates complex modulation symbols by performing modulation on the generated encoding information bit stream, and spreads the complex modulation symbols block-wise based on an orthogonal sequence. The encoding information bit stream is generated by channel coding in which the UCI bit stream is circularly repeated. The memory 920 is connected to the processor 910, and it stores various pieces of information for driving the processor 910. The RF unit 930 is connected to the processor 910, and it transmits spread complex modulation symbols to a BS.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The RF units 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art. In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification is intended to embrace all such alternations, modifications and variations that fall within the spirit and scope of the appended claims.

What is claimed is:

1. A method of transmitting, by a user equipment (UE), uplink control information (UCI) on a physical uplink control channel (PUCCH) in a wireless communication system, the method comprising:
   generating encoding information bits by performing channel coding on information bits of the UCI, a length of the information bits of the UCI being smaller than a reference value M, the encoding information bits being generated by circular repetition of a sequence which is based on the information bits of the UCI;
   generating scrambled bits by scrambling the encoding information bits based on a UE-specific scrambling sequence;
   generating complex modulation symbols by modulating the scrambled bits;
   block-wise spreading the complex modulation symbols based on an orthogonal sequence; and
   transmitting the spread complex modulation symbols to a base station.

2. The method of claim 1, wherein the information bits of the UCI are hybrid automatic repeat request (HARQ)-acknowledgement (ACK) information bits.

3. The method of claim 1, wherein M=11.

4. The method of claim 1, wherein the encoding information bits are subject to rate matching.

5. The method of claim 4, wherein the rate matching is performed using a circular buffer.

6. The method of claim 4, wherein the rate matching is performed by sequentially reading the sequence.

7. The method of claim 1 wherein length of the encoding information bits is 48.

8. The method of claim 1, wherein the complex modulation symbols are quadrature phase shift keying (QPSK) symbols generated by QPSK modulation.

9. The method of claim 1, wherein the complex modulation symbols are block-wise spread into a plurality of single carrier-frequency division multiple access (SC-FDMA) symbols.

10. The method of claim 1, wherein the orthogonal sequence is a Walsh code.

11. The method of claim 1, wherein the orthogonal quence is hopped in a slot level.

12. A user equipment in a wireless communication system, the user equipment comprising:
    a radio frequency (RF) unit configured to transmit or receive radio signals; and
    a processor connected to the RF unit, and configured for:
    generating encoding information bits by performing channel coding on information bits of the UCI, a length of the information bits of the UCI being smaller than a reference value M, the encoding information bits being generated by circular of a sequence ,which is based on the information bits of the UCI;
    generating scrambled bits by scrambling the encoding information bits based on a UE-specific scrambling sequence;
    generating complex modulation symbols by modulating the scrambled bits;
    block-wise spreading the complex modulation symbols based on an orthogonal sequence; and
    transmitting the spread complex modulation symbols to a base station.

13. The user equipment of claim 12, wherein the encoding information bits are subject to rate matching.

14. The user equipment of claim 12, wherein M=11.

* * * * *